US011372610B2

(12) United States Patent  
Gomes Chang et al.

(10) Patent No.: US 11,372,610 B2  
(45) Date of Patent: Jun. 28, 2022

(54) DISPLAY DEVICE, AND DISPLAY METHOD

(71) Applicant: HONDA MOTOR CO., LTD., Tokyo (JP)

(72) Inventors: Genesio Agostinho Gomes Chang, Wako (JP); Masayuki Morita, Wako (JP); Hisayuki Nagashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 16/660,940

(22) Filed: Oct. 23, 2019

(65) Prior Publication Data

US 2020/0210131 A1 Jul. 2, 2020

(30) Foreign Application Priority Data

Dec. 26, 2018 (JP) .............................. JP2018-243673

(51) Int. Cl.
*G06F 3/14* (2006.01)
*G06F 3/0488* (2022.01)
(Continued)

(52) U.S. Cl.
CPC .......... *G06F 3/1423* (2013.01); *G06F 3/0412* (2013.01); *G06F 3/0488* (2013.01); *G06F 3/04817* (2013.01)

(58) Field of Classification Search
None
See application file for complete search history.

(56) References Cited

U.S. PATENT DOCUMENTS 6,067,078 A * 5/2000 Hartman ................ B60K 35/00  
    345/157  
6,512,497 B1 * 1/2003 Kondo .................. G06F 1/3265  
    345/1.1

(Continued)

FOREIGN PATENT DOCUMENTS

JP     2007-076384     3/2007  
JP     2014-021833     2/2014

(Continued)

OTHER PUBLICATIONS

Japanese Notice of Allowance for Japanese Patent Application No. 2018-243673 dated Sep. 15, 2020.

*Primary Examiner* — Patrick N Edouard  
*Assistant Examiner* — Peijie Shen  
(74) *Attorney, Agent, or Firm* — Amin, Turocy & Watson, LLP

(57) ABSTRACT

A display device includes displays and a processor configured to execute a first application program, wherein the first application program causes a first or second display to display a specific screen on which information about a function of an application program is displayed, wherein the first application program causes the second display to display a screen when associated information associated with the function that has been displayed or associated information associated with another function different from the function is input in a state in which the specific screen has been displayed by the second display, and wherein the first application program causes a predetermined display among the plurality of displays to display the screen associated with the associated information when the associated information is input in a state in which the specific screen has not been displayed by any one of the plurality of display.

15 Claims, 20 Drawing Sheets

(51) Int. Cl.
  *G06F 3/041*   (2006.01)
  *G06F 3/0481*  (2022.01)
  *G06F 3/04817* (2022.01)

(56) References Cited

U.S. PATENT DOCUMENTS

| | | | | |
|---|---|---|---|---|
| 2009/0284474 | A1* | 11/2009 | Komaki | G08G 1/096883 |
| | | | | 345/1.3 |
| 2012/0081323 | A1* | 4/2012 | Sirpal | G06F 3/04842 |
| | | | | 345/173 |
| 2012/0284361 | A1* | 11/2012 | Henschel | H04L 43/50 |
| | | | | 709/217 |
| 2013/0138265 | A1* | 5/2013 | Kim | B60K 35/00 |
| | | | | 701/1 |
| 2014/0101579 | A1* | 4/2014 | Kim | G06F 3/04845 |
| | | | | 715/761 |
| 2014/0111540 | A1* | 4/2014 | Morimoto | G06T 11/20 |
| | | | | 345/619 |
| 2014/0165005 | A1* | 6/2014 | Takikawa | B60K 37/06 |
| | | | | 715/835 |
| 2014/0351748 | A1* | 11/2014 | Xia | G06F 3/0488 |
| | | | | 715/798 |
| 2015/0224876 | A1* | 8/2015 | Tsunoda | G06F 3/0486 |
| | | | | 345/2.2 |
| 2016/0004418 | A1* | 1/2016 | Lee | B60K 35/00 |
| | | | | 715/765 |
| 2016/0018943 | A1* | 1/2016 | Nara | G06F 3/0416 |
| | | | | 345/173 |
| 2016/0046188 | A1* | 2/2016 | Wild | B60K 35/00 |
| | | | | 701/36 |
| 2016/0162130 | A1* | 6/2016 | Yoon | G06F 3/04845 |
| | | | | 715/783 |
| 2016/0227009 | A1* | 8/2016 | Kim | H04N 7/185 |
| 2016/0328244 | A1* | 11/2016 | Ahmed | G06F 3/04886 |
| 2017/0253122 | A1* | 9/2017 | Jun | G01C 21/365 |
| 2017/0255441 | A1* | 9/2017 | Kosinski, II | G06F 3/147 |
| 2017/0269704 | A1* | 9/2017 | Akita | B60K 35/00 |
| 2018/0095585 | A1* | 4/2018 | Kumon | G01C 21/3688 |
| 2018/0101351 | A1* | 4/2018 | Kumon | G01C 21/3664 |
| 2018/0129466 | A1* | 5/2018 | Kanki | G09G 5/32 |
| 2018/0136902 | A1* | 5/2018 | Feit | G06F 3/0883 |
| 2018/0226077 | A1* | 8/2018 | Choi | B60K 35/00 |
| 2018/0273050 | A1* | 9/2018 | Tertoolen | G06F 3/013 |
| 2019/0070959 | A1* | 3/2019 | Hamasaki | G06F 13/00 |
| 2019/0079717 | A1* | 3/2019 | Lee | B60K 37/06 |
| 2019/0155455 | A1* | 5/2019 | Wild | G06F 9/451 |
| 2019/0196679 | A1* | 6/2019 | You | B60K 35/00 |
| 2020/0057596 | A1* | 2/2020 | Kim | G06F 3/1454 |
| 2020/0159481 | A1* | 5/2020 | You | G06F 3/1423 |
| 2020/0192564 | A1* | 6/2020 | Zhu | G06F 3/1454 |
| 2020/0218443 | A1* | 7/2020 | Narayan | G06F 3/04886 |
| 2020/0218487 | A1* | 7/2020 | Rush | B60K 35/00 |
| 2020/0219469 | A1* | 7/2020 | Mittal | G09G 5/14 |

FOREIGN PATENT DOCUMENTS

| | | |
|---|---|---|
| JP | 2017-507399 | 3/2017 |
| JP | 2018-001864 | 1/2018 |

* cited by examiner

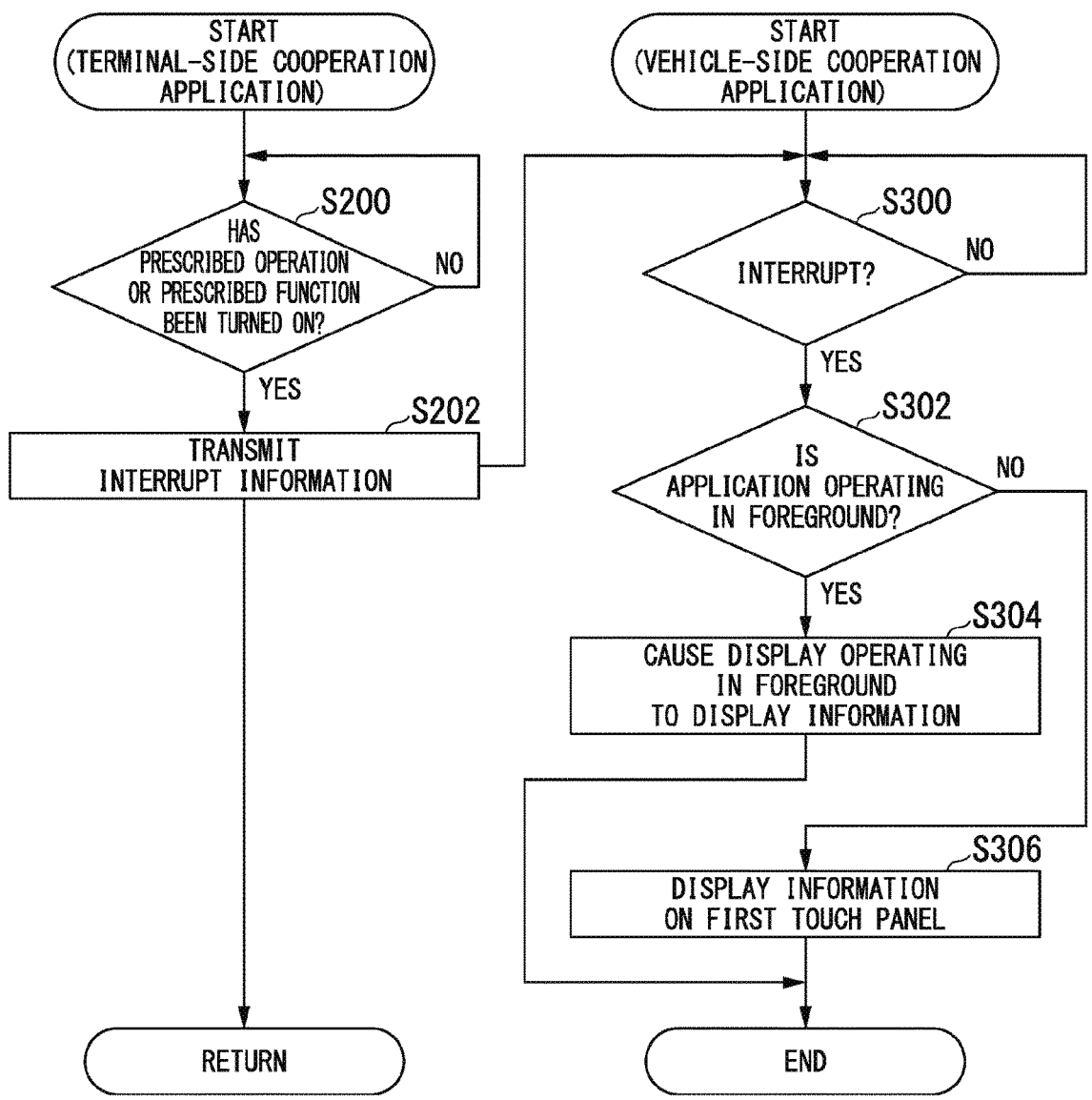

FIG. 13

| IDENTIFICATION NUMBER | STATE OF APPLICATION | OPERATING STATE | DISPLAY CORRESPONDING TO BACKGROUND | DISPLAY | DISPLAY CONTENT | OPERATION (TRANSITION) | INTERRUPT | INTERRUPT INFORMATION |
|---|---|---|---|---|---|---|---|---|
| 001 | DEACTIVATED | - | - | - | - | - | - | - |
| 002 | ACTIVATED | FOREGROUND | - | SECOND TOUCH PANEL | APPLICATION MENU CONTENT | - | - | - |
| 003 | ACTIVATED | FOREGROUND | - | SECOND TOUCH PANEL | APPLICATION MENU CONTENT | - | O | TELEPHONE |
| 004 | ACTIVATED | FOREGROUND | - | SECOND TOUCH PANEL | TELEPHONE CONTENT | - | O | TELEPHONE |
| ... | ... | ... | ... | ... | ... | ... | ... | ... |
| 020 | ACTIVATED | - | - | - | - | - | - | - |
| 021 | ACTIVATED | BACKGROUND | SECOND TOUCH PANEL | - | - | - | - | - |
| 022 | ACTIVATED | BACKGROUND | SECOND TOUCH PANEL | - | - | - | O | TELEPHONE |
| 023 | ACTIVATED | FOREGROUND | - | FIRST TOUCH PANEL | TELEPHONE CONTENT | - | O | TELEPHONE |
| ... | ... | ... | ... | ... | ... | ... | ... | ... |
| 031 | ACTIVATED | BACKGROUND | SECOND TOUCH PANEL | - | - | OPERATION A | - | - |
| 032 | ACTIVATED | FOREGROUND | - | FIRST TOUCH PANEL | APPLICATION MENU CONTENT | - | - | - |
| ... | ... | ... | ... | ... | ... | ... | ... | ... |

56

| HISTORY ID | CONTINUOUS TIME | CONTINUOUS TIME | NUMBER OF TIMES POWER SUPPLY IS TURNED ON OR OFF | OPERATION HISTORY |
|---|---|---|---|---|
| 001 (m/d1-d5) | 8hr (FIRST TOUCH PANEL) | 8hr (SECOND TOUCH PANEL) | 10 | OPERATION A |
| 002 (m/d6-d10) | 10hr (FIRST TOUCH PANEL) | 5hr (SECOND TOUCH PANEL) | 15 | OPERATION B |
| 003 (m/d11-d15) | 5hr (FIRST TOUCH PANEL) | 15hr (SECOND TOUCH PANEL) | 30 | OPERATION C |
| ⋮ | ⋮ | ⋮ | ⋮ | ⋮ |

58 — FOR EACH TERMINAL ID

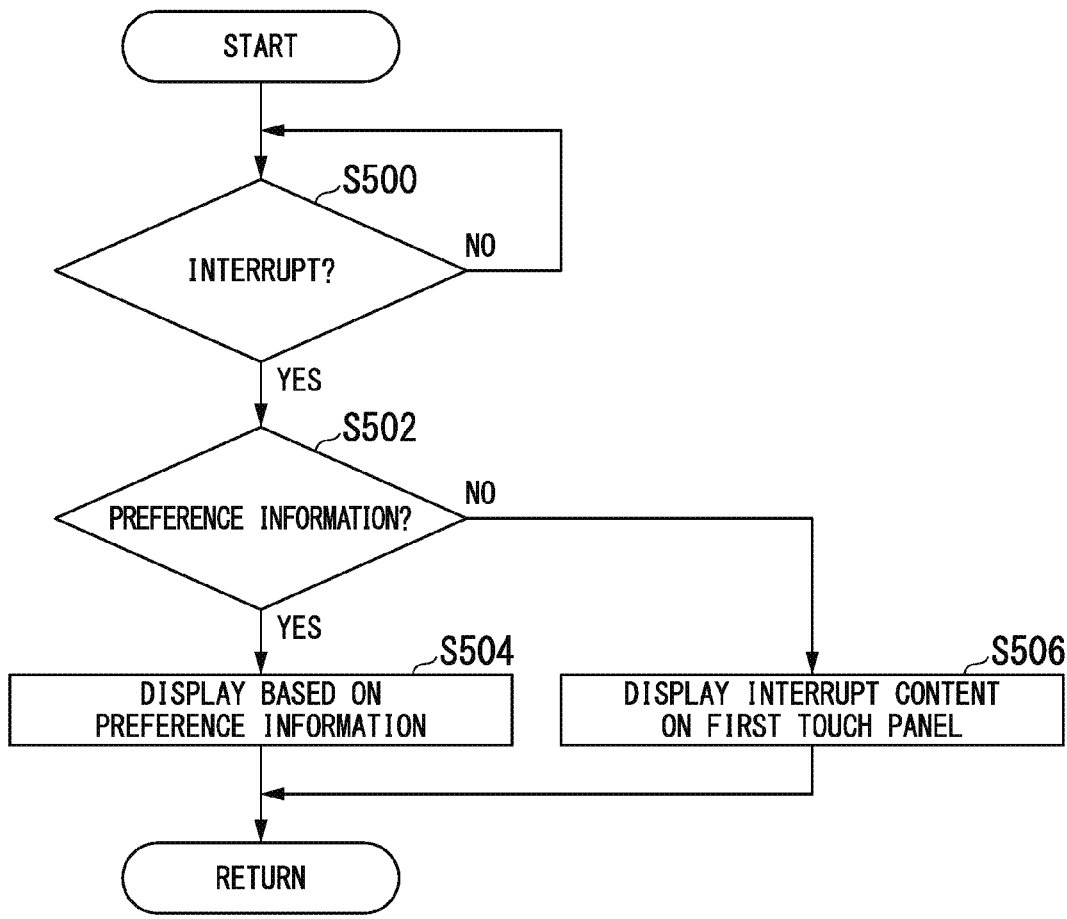

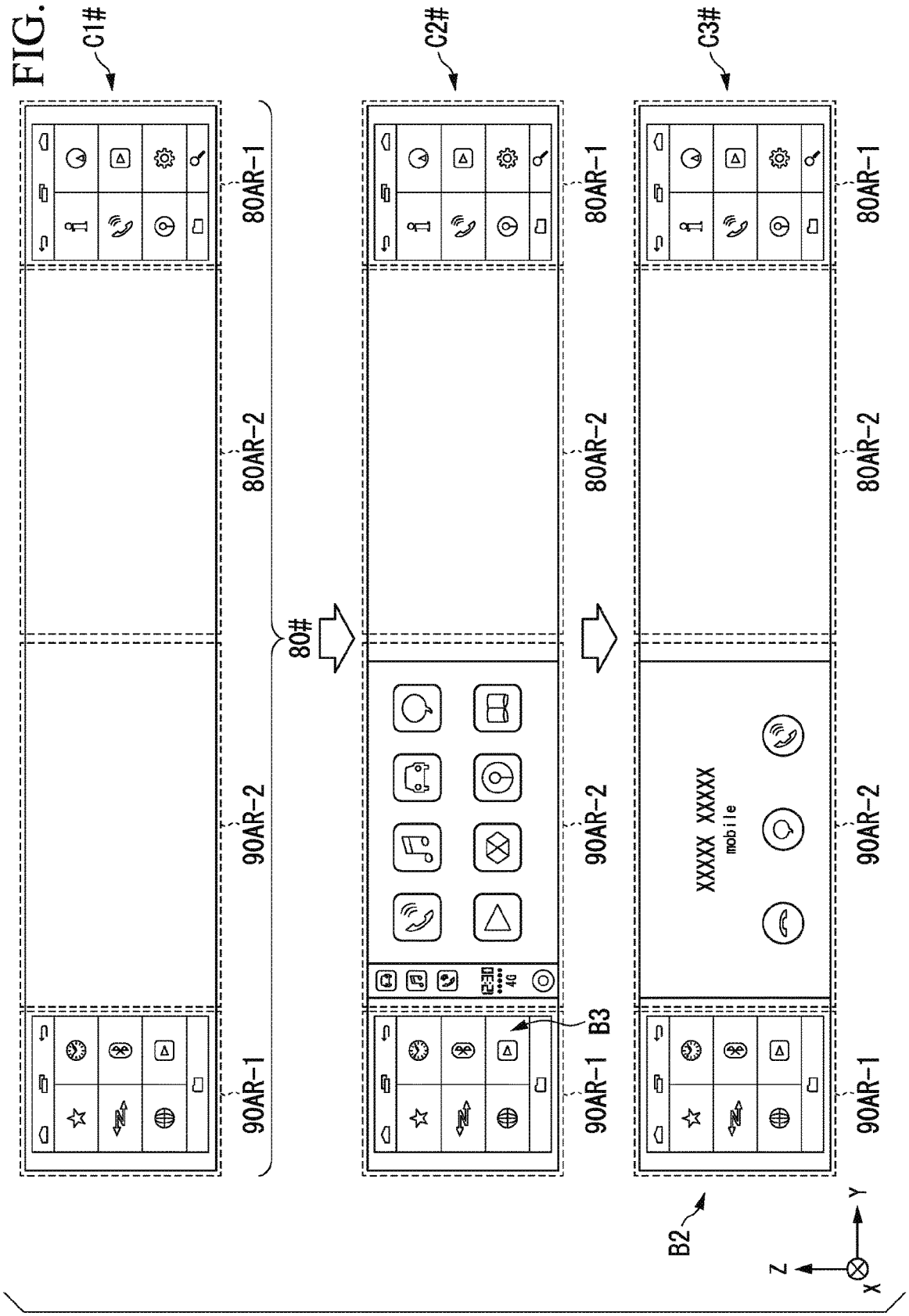

DISPLAY DEVICE, AND DISPLAY METHOD

CROSS-REFERENCE TO RELATED APPLICATION

Priority is claimed on Japanese Patent Application No. 2018-243673, filed Dec. 26, 2018, the content of which is incorporated herein by reference.

BACKGROUND OF THE INVENTION

Field of the Invention

The present invention relates to a display device and a display method.

Description of Related Art

Conventionally, a display controller having an output arbitration function of distributing and outputting a plurality of types of interrupt screens based on display requests from a plurality of applications operating in parallel to a plurality of displays provided in a vehicle has been disclosed. The display controller determines a display serving as an output destination of each interrupt screen on the basis of a priority of the output destination and outputs each interrupt screen to the determined display (Japanese Unexamined Patent Application, First Publication No. 2014-21833).

However, when the output of the interrupt screen based on the priority is performed in the display, the convenience to a user may be low according to a usage state of the application.

SUMMARY OF THE INVENTION

The present invention has been made in consideration of such circumstances and an objective thereof is to provide a display device and a display method capable of improving the convenience to a user.

A display device, a display method, and a storage medium according to the present invention adopt the following configurations.

(1): According to an aspect of the present invention, a display device is provided, including: a plurality of displays; and a processor configured to execute a first application program, wherein the first application program causes a first or second display among the plurality of displays to display a specific screen on which information about a function of an application program is displayed, wherein the first application program causes the second display to display a screen associated with associated information when associated information associated with the function that has been displayed or associated information associated with another function different from the function is input in a state in which the specific screen has been displayed by the second display, and wherein the first application program causes a predetermined display among the plurality of displays to display the screen associated with the associated information when the associated information is input in a state in which the specific screen has not been displayed by any one of the plurality of displays.

(2): In the above-described aspect (1), the specific screen is a menu screen on which icons of a plurality of application programs are displayed or a screen related to functions to be executed by the application programs related to the icons.

(3): In the above-described aspect (1) or (2), each of the plurality of displays is provided in a vehicle interior of a vehicle, the second display is provided more biased toward a passenger seat side than the first display in a vehicle width direction, and the predetermined display is the first display.

(4): In any one of the above-described aspects (1) to (3), the first application program causes the first or second display among the displays to display a menu screen on which icons of a plurality of application programs are displayed, application programs related to at least some icons are application programs to be executed in a terminal device that communicates with the display device via wireless communication or wired communication, and the first application program causes operations of the application programs related to the at least some icons to be started in a background operation after the display device is communicably connected to the terminal device.

(5): In any one of the above-described aspects (1) to (3), the first application program causes the first or second display among the displays to display a menu screen on which icons of a plurality of application programs are displayed, application programs related to at least some icons are application programs to be executed in a terminal device that communicates with the display device via wireless communication or wired communication, and the first application program causes an operation to be started in the background after the display device is communicably connected to the terminal device.

(6): In any one of the above-described aspects (1) to (5), the specific screen is a menu screen on which icons of a plurality of application programs are displayed or a screen related to functions to be executed by application programs related to the icons, and the first application program causes the first display among the plurality of displays to display a screen associated with the associated information if the associated information is input when a process related to displaying of the specific screen is being executed in a background operation.

(7): In any one of the above-described aspects (1) to (5), the specific screen is a menu screen on which icons of a plurality of application programs are displayed or a screen related to functions to be executed by application programs related to the icons, and the first application program causes a display associated with a background operation to display a screen associated with the associated information if the associated information is input when a process related to displaying of the specific screen is being executed by the background operation.

(8): In any one of the above-described aspects (1) to (7), the specific screen is a menu screen on which icons of a plurality of application programs are displayed or a screen related to functions to be executed by application programs related to the icons, and the screen associated with the associated information is a screen related to functions to be executed by application programs related to at least some icons.

(9): In the above-described aspect (8), the first application program causes the first or second display among the displays to display the menu screen on which the icons of the plurality of application programs are displayed, and the first application program causes a terminal device, which communicates with the display device, to execute the function based on an operation on the icon when information indicating that the operation has been performed on the icon displayed on the menu screen has been acquired.

(10): In any one of the above-described aspects (1) to (9), the display device further includes a storage configured to store associated information in which the associated information is associated with information about the screen associated with the associated information, wherein the first application program causes the first or second display to display the screen associated with the associated information associated with the input associated information with reference to the associated information.

(11): According to another aspect of the present invention, a display device is provided, including: a display; and a processor configured to execute a first application program, wherein the first application program causes a specific screen on which information about a function of an application program is displayed to be displayed in a first information display region or a second information display region of the display, wherein the first application program causes a screen associated with associated information to be displayed in the second information display region when associated information associated with the function that has been displayed or associated information associated with another function different from the function is input in a state in which the specific screen has been displayed in the second display region, and wherein the first application program causes the screen associated with the associated information to be displayed in a predetermined display region of the display when the associated information is input in a state in which the specific screen has not been displayed in either one of the first information display region and the second information display region of the display.

(12): According to an aspect of the present invention, a display method is provided, including: causing, by a computer, a first or second display among a plurality of displays to display a specific screen on which information about a function of an application program is displayed; causing, by the computer, the second display to display a screen associated with associated information when associated information associated with the function that has been displayed or associated information associated with another function different from the function is input in a state in which the specific screen has been displayed by the second display; and causing, by the computer, a predetermined display among the plurality of displays to display the screen associated with the associated information when the associated information is input in a state in which the specific screen has not been displayed by any one of the plurality of displays.

(13): According to an aspect of the present invention, a storage medium is provided for causing a computer to execute: a first process of causing a first or second display among the plurality of displays to display a specific screen on which information about a function of an application program is displayed; a second process of causing the second display to display a screen associated with associated information when associated information associated with the function that has been displayed or associated information associated with another function different from the function is input in a state in which the specific screen has been displayed by the second display; and a third process of causing a predetermined display among the plurality of displays to display the screen associated with the associated information when the associated information is input in a state in which the specific screen has not been displayed by any one of the plurality of displays.

According to (1) to (13), it is possible to improve the convenience to a user. For example, it is possible to display content in a display form according to the user's intention because content is displayed in accordance with an operating state of an application program.

BRIEF DESCRIPTION OF THE DRAWINGS

FIG. 5 is a flowchart showing a flow of an interrupt process to be executed by a terminal-side cooperation application and the vehicle-side cooperation application.

FIG. 6 is a diagram showing an example of details of associated information.

FIG. 13 is a diagram showing an example of details of state information.

FIG. 19 is a diagram showing an example of details of preference information.

FIG. 20 is a flowchart showing an example of a flow of a process to be executed by a vehicle-side cooperation application of the third embodiment.

FIG. 21 is a diagram showing an example of a touch panel.

DETAILED DESCRIPTION OF THE INVENTION

Hereinafter, embodiments of a display device, a display method, and a storage medium according to the present invention will be described with reference to the drawings.

For example, a display system including the display device is provided in a vehicle (not shown). For example, a driving source of the vehicle is an electric motor, an internal combustion engine such as a diesel engine or a gasoline engine, or a combination thereof. The electric motor operates using discharge power of a secondary battery or a fuel cell or electric power generated by a power generator connected to the internal combustion engine.

In the following description, a positional relationship and the like will be appropriately described using an XYZ coordinate system. An X direction is a central axis direction (a forward direction) of a vehicle body and a Y direction is a width direction of the vehicle, i.e., a direction perpendicular to the X direction within a horizontal plane. A Z direction is a direction perpendicular to the X direction and the Y direction.

First Embodiment

Figure 1:
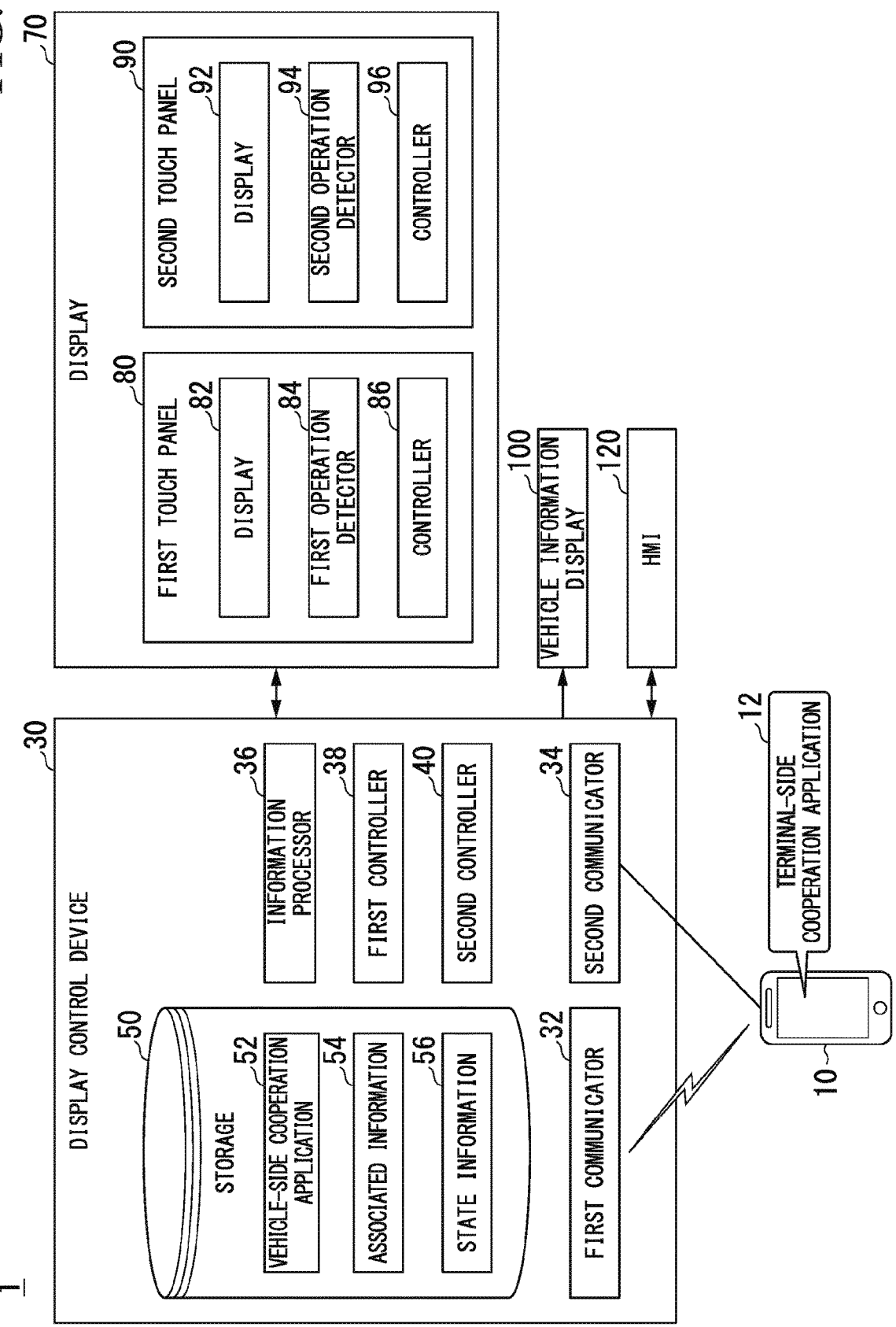
FIG. 1 is a diagram showing an example of a configuration of a display system installed in a vehicle.

FIG. 1 is a diagram showing an example of a configuration of a display system 1 installed in the vehicle. The display system 1 includes a terminal device 10, a display control device 30, a display 70, a vehicle information display 100, and a human machine interface (HMI) 120.

For example, the terminal device 10 is a terminal device such as a smartphone, a tablet terminal, or a personal computer. In the terminal device 10, an application program that cooperates with the display control device 30, a browser, or the like is activated and performs a process executed in cooperation with the display control device 30. In the following description, it is assumed that the terminal device 10 is a smartphone and a central processing unit (CPU) of the smartphone executes an application program (a terminal-side cooperation application 12) to perform each process. The terminal-side cooperation application 12 cooperates with the display control device 30 on the basis of an operation of a holder of the terminal device 10, information transmitted by the display control device 30, and the like. The terminal-side cooperation application 12 activates or operates each function (for example, a music player function, a sound recognition function, a route search function, a telephone function, a mail function, or the like) of the terminal device 10. The sound recognition function is a function that activates an application program or answers a question in response to a recognized sound. Each of these functions or the terminal-side cooperation application 12 is an example of "an application program to be executed in the terminal device 10".

[Display Control Device]

The display control device 30 includes, for example, a first communicator 32, a second communicator 34, an information processor 36, a first controller 38, a second controller 40, and a storage 50. The information processor 36 and the second controller 40 are implemented, for example, when a computer processor such as a CPU executes a program (software). Some or all of these components are implemented, for example, by hardware (a circuit including circuitry) such as large-scale integration (LSI), an application-specific integrated circuit (ASIC), a field-programmable gate array (FPGA), or a graphics-processing unit (GPU) or may be implemented by cooperation between software and hardware. The program may be pre-stored in the storage 50 of the display control device 30 or pre-stored in a removable storage medium (a non-transitory storage medium) such as a DVD or a CD-ROM. The program may be installed in the storage 50 when the storage medium is mounted in a drive device. Among the above-described functional parts, a prescribed functional part may be integrated with another functional part and a process to be executed by the other functional part may be performed by a functional part different from the other functional parts described above.

The first controller 38 is implemented by a computer processor such as a CPU executing a vehicle-side cooperation application program (a vehicle-side cooperation application) 52. Some or all of the functions of the first controller 38 may be implemented by hardware (a circuit including circuitry) such as LSI, ASIC, FPGA, or GPU, or implemented by cooperation between software and hardware. The vehicle-side cooperation application 52 may be pre-stored in the storage 50 of the display control device 30 or pre-stored in a removable storage medium (a non-transitory storage medium) such as a DVD or a CD-ROM. The vehicle-side cooperation application 52 may be installed in the storage 50 when the storage medium is mounted in a drive device. The display control device 30 may download the vehicle-side cooperation application 52 by communicating with a service server device that provides the vehicle-side cooperation application 52.

The storage 50 is implemented by, for example, a storage device including a non-transitory storage medium such as an HDD, a flash memory, an electrically erasable programmable read-only memory (EEPROM), or a read-only memory (ROM), or a random-access memory (RAM). The storage 50 stores, for example, a program or the like to be read and executed by the processor. As described above, the storage 50 stores the vehicle-side cooperation application 52, associated information 54, and state information 56. Details of the associated information 54 will be described below. The state information 56 is information representing details and processing results of a process performed by the vehicle-side cooperation application 52 (see FIG. 13 to be described below).

The first communicator 32 is, for example, a communication interface for communicating with the terminal device 10 through wireless communication. The first communicator 32 communicates with the terminal device 10 using a communication standard such as Wi-Fi. The first communicator 32 may perform wireless communication on the basis of Bluetooth (registered trademark) or other communication standards.

The second communicator 34 is a communication interface for performing wired communication with the terminal device 10. For example, the second communicator 34 communicates with the terminal device 10 via a communication cable connected to a universal serial bus (USB) port (not shown) or the like.

The information processor 36 acquires information transmitted by the terminal device 10, outputs the acquired information to the first controller 38, or causes the storage 50 to store the acquired information. The information processor 36 uses the first communicator 32 or the second communicator 34 to transmit a processing result of the display control device 30 to the terminal device 10.

The first controller 38 causes a first touch panel 80 (an example of a "first display") or a second touch panel 90 (an example of a "second display") among a plurality of displays to display a menu screen on which one or more application program icons are displayed, causes the second touch panel 90 to display a screen associated with associated information when associated information associated with application programs related to at least some icons of the displayed icons is input in a state in which the menu screen has been displayed by the second touch panel 90, and causes a predetermined touch panel among the plurality of displays to display a screen associated with the associated information when the associated information is input in a state in which the menu screen has not been displayed by any one of the plurality of displays. Details of this process will be described below.

The second controller 40 controls the display 70 on the basis of a processing result of the first controller 38. For example, the second controller 40 causes the display 82 of the first touch panel 80 or the display 92 of the second touch panel 90 to display content, an operation button, and the like on the basis of an instruction of the first controller 38. The second controller 40 controls the vehicle information display 100 and the HMI 120.

[Display]

For example, the display 70 includes the first touch panel 80 and the second touch panel 90. The touch panel is a device in which a display for displaying information and a mechanism for receiving an input of an operation in which an indicator is in contact with the display are integrated. When the first touch panel 80 and the second touch panel 90 are not distinguished, they may be simply referred to as "displays".

Figure 2:
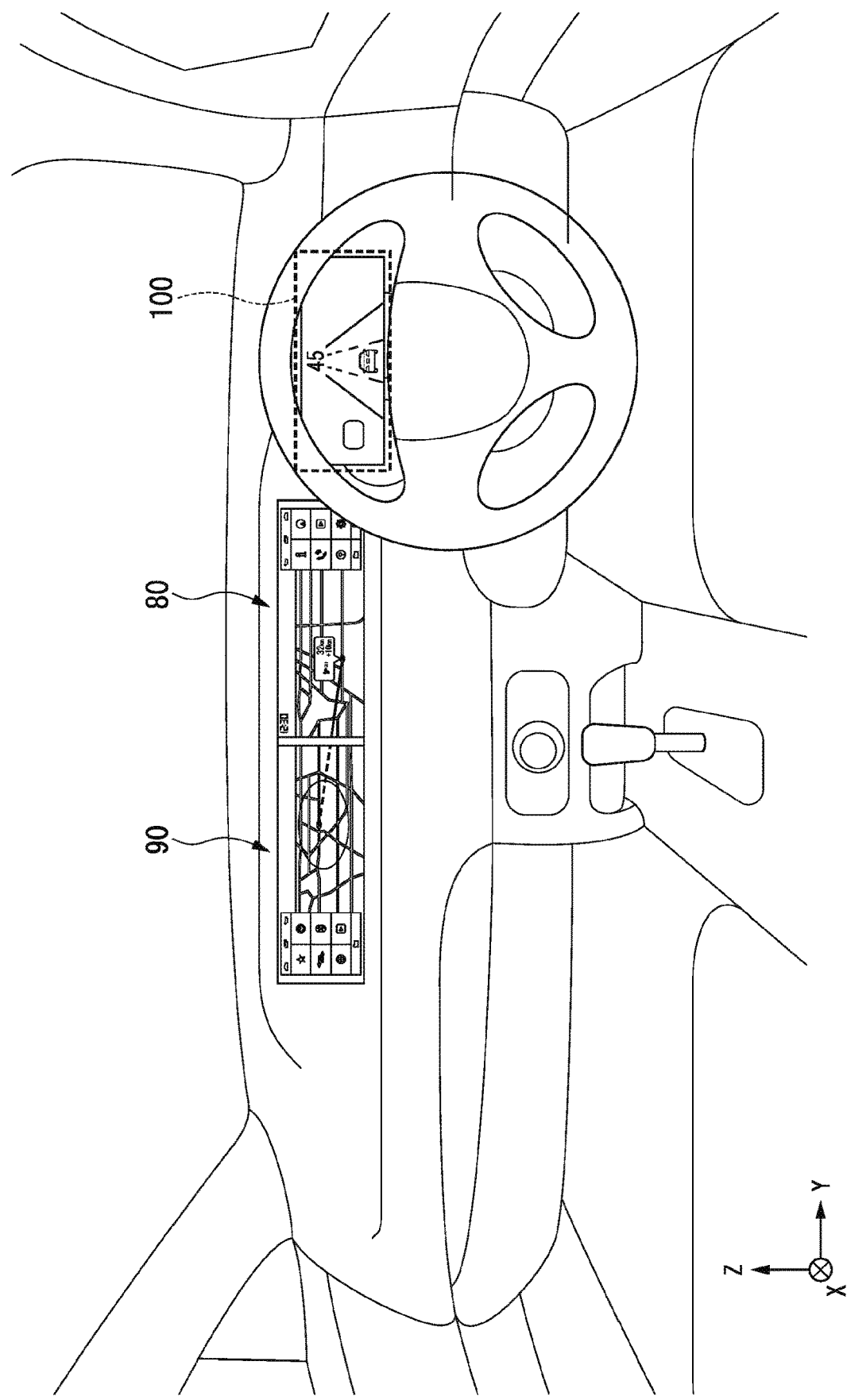
FIG. 2 is a diagram showing an example of a display and a vehicle information display provided in a vehicle interior.

The display 70 will be described with reference to FIGS. 1 and 2. FIG. 2 is a diagram showing an example of the display 70 and the vehicle information display 100 provided in the vehicle interior. The first touch panel 80 is a display for a driver, and is arranged at a position where the driver easily achieves visual recognition (a position at which visual recognition is possible). The second touch panel 90 is a display for the driver or another occupant (an occupant sitting in the passenger seat) and is arranged at a position where the driver or the occupant can achieve visual recognition.

The first touch panel 80 is provided in the forward direction (the X direction) of the driver's seat on an instrument panel within the vehicle. For example, the first touch panel 80 is arranged at the driver's seat side of the instrument panel in the vehicle or in the vicinity of the center thereof.

The second touch panel 90 is provided more biased toward the passenger seat side than the first touch panel 80. The second touch panel 90 is provided at a position which is in the vehicle width direction (the Y direction) with respect to the first touch panel and is closer to the passenger seat than the first touch panel 80 (a position of the negative Y direction side). For example, the second touch panel 90 is provided adjacent to the first touch panel 80. For example, a display surface of the first touch panel 80 and a display surface of the second touch panel 90 are juxtaposed so that they form substantially the same surface in the forward direction (in the X direction). Information displayed on the first touch panel 80 and the second touch panel 90 will be described below with reference to FIG. 3.

The first touch panel 80 is, for example, a touch panel type display including the display 82, a first operation detector 84, and a controller 86. The display 82 is a liquid crystal display (LCD), an organic electro luminescence (EL) display device, or the like.

The first operation detector 84 detects an operation performed on the display surface of the display 82 and outputs a detection result to the display control device 30. The detection result is, for example, operation information indicating an operation form such as information indicating which position on the display surface of the image has been touched to what degree or an operation time. For example, the first operation detector 84 detects a degree of change related to a reference value of electrostatic capacitance of the display surface, derives operation information indicating an operation form on the basis of a detection result, and outputs the derived operation information to the display control device 30. The first operation detector 84 may derive the operation information on the basis of a technique such as a resistive film scheme or an external ray scanning scheme.

The controller 86 controls the first touch panel 80 so that the first touch panel 80 is in an on state or an off state on the basis of an instruction of the display control device 30 or displays a desired image on the display of the display 70. The controller 86 transmits the detection result of the first operation detector 84 to the display control device 30.

The second touch panel 90 includes, for example, a display 92, a second operation detector 94, and a controller 96. The function of the display 92 is similar to the function of the display 82 and the function of the second operation detector 94 is similar to the function of the first operation detector 84. The function of the controller 96 is similar to the function of the controller 86. Here, a control target of the controller 96 is the display 92. The controller 96 transmits a detection result of the second operation detector 94 to the display control device 30.

The vehicle information display 100 is, for example, an LCD, an organic EL display device, or the like. The vehicle information display 100 is provided on the positive Y direction side of the first touch panel 80 in the forward direction of the driver's seat. The vehicle information display 100 displays information required to be recognized by the driver in driving the vehicle such as a vehicle speed and a state of the driving source (for example, an operating state of the electric motor or an engine speed).

In the example of FIG. 2, the arrangement of the first touch panel 80 and the second touch panel 90 in a vehicle with a right-hand steering wheel is shown. However, in the case of a vehicle with a left-hand steering wheel, the vehicle information display 100, the first touch panel 80, and the second touch panel 90 are arranged in that order from the negative Y direction side. A predetermined display provided on a side closer (more biased) to the passenger seat may be referred to as the "first display" and a display provided on a side closer (more biased) to the driver's seat than the "first display" may be referred to as the "second display".

The HMI 120 presents various types of information to the occupant within the vehicle and receives input operations of the occupant. The HMI 120 is, for example, various types of display devices, a touch panel, a speaker, a microphone, a switch, or the like. The HMI 120 includes, for example, a cooperation function switch that switches a sound recognition function and other functions capable of being executed by the terminal-side cooperation application 12 of the terminal device 10 that can cooperate with the vehicle-side cooperation application 52 to an on state or an off state. A sound recognition switch thereof is provided at a position where an operation of the driver is easy, for example, a steering wheel or the like.

[Details Displayed on First and Second Touch Panels]

Figure 3:
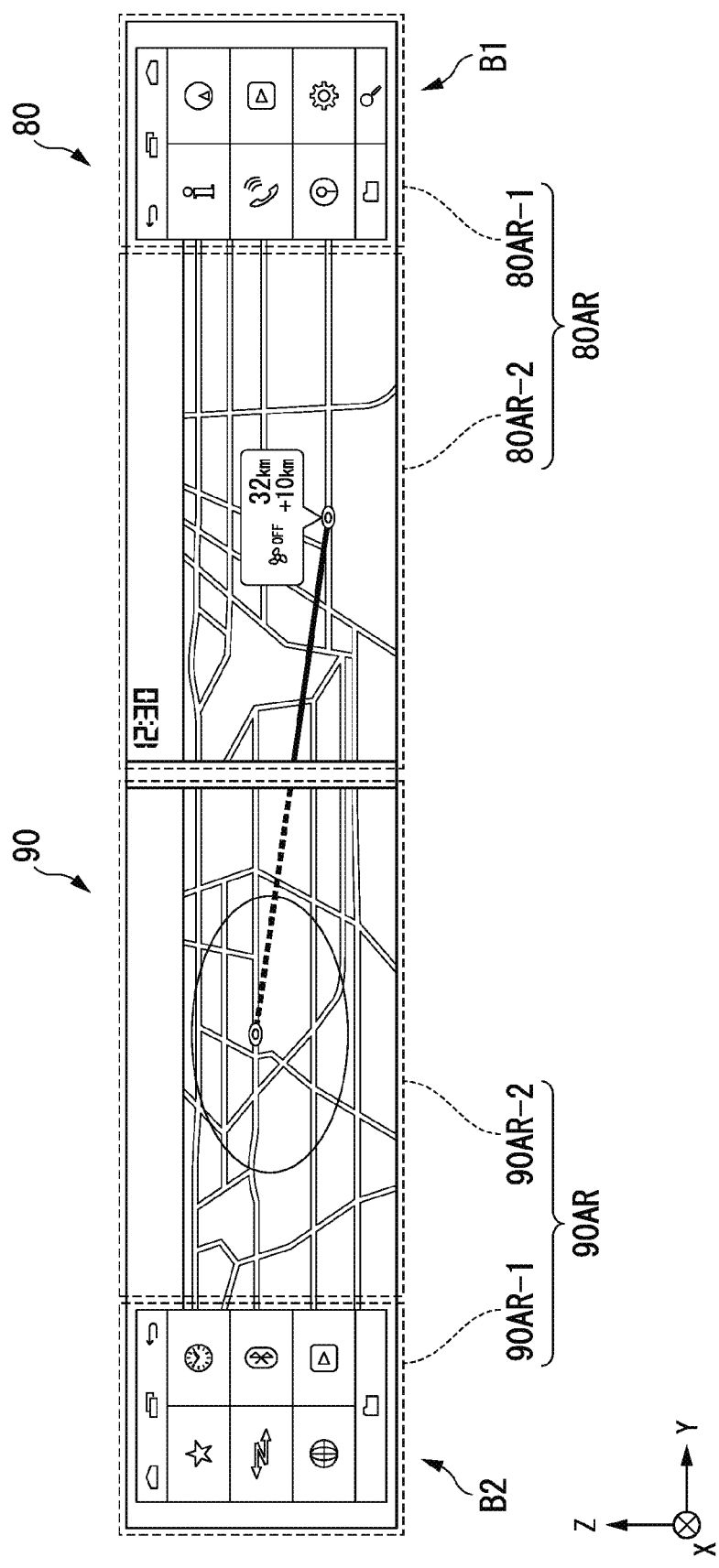
FIG. 3 is a diagram showing an example of images displayed on a first touch panel and a second touch panel.

FIG. 3 is a diagram showing an example of images displayed on the first touch panel 80 and the second touch panel 90. The first touch panel 80 includes a region 80AR. The region 80AR is a display region for displaying an image of prescribed information, an operation button, and the like on the basis of control of the display control device 30. The operation button is a graphical user interface (GUI) switch.

The region 80AR includes, for example, a first display region 80AR-1 and a second display region 80AR-2. The first display region 80AR-1 is a region of the positive Y direction side of the first touch panel 80. The second display region 80AR-2 is a region of the negative Y direction side of the first touch panel 80. In the first touch panel 80, the first display region 80AR-1 is a region closer to the driver's seat (more biased toward the driver's seat and further away from the passenger seat) than the second display region 80AR-2. For example, the first display region 80AR-1 is a region smaller than the second display region 80AR-2. A ratio between the length of the first display region 80AR-1 in the Y direction and the length of the second display region 80AR-2 in the Y direction is a prescribed ratio such as 1:3 or 1:2.

In the example of FIG. 3, for example, the first operation buttons B1 superimposed on a prescribed content image are displayed in the first display region 80AR-1. For example, the first operation buttons B1 are set to be biased toward the side further away from the passenger seat with respect to the display 82 of the first touch panel 80 in the vehicle width direction. For example, the first operation buttons B1 are set at or near the end of the display 82 in the positive Y direction. For example, the first operation buttons B1 are set in an outermost division region (in the positive Y direction) when the region is divided into three or four regions (or divided into a prescribed number of regions) with respect to the display 82 in the Y direction. In the second display region 80AR-2, for example, a prescribed content image is displayed. In the first display region 80AR-1, for example, no prescribed content image is displayed and only the first operation buttons B1 may be displayed.

The second touch panel 90 includes a region 90AR. The region 90AR is a display region for displaying an image of prescribed information, the second operation buttons B2, and the like on the basis of control of the display control device 30. The second operation button B2 is a GUI switch. The region 90AR includes, for example, a third display region 90AR-1 and a fourth display region 90AR-2. The third display region 90AR-1 is a region on the negative Y direction side of the second touch panel 90. The fourth display region 90AR-2 is a region on the positive Y direction side of the second touch panel 90. In the second touch panel 90, the third display region 90AR-1 is a region closer to the passenger seat (more biased toward the passenger seat and further away from the driver's seat) than the fourth display region 90AR-2. For example, the third display region 90AR-1 is a region smaller than the fourth display region 90AR-2. A ratio between the length of the third display region 90AR-1 in the Y direction and the length of the fourth display region 90AR-2 in the Y direction is a prescribed ratio such as 1:3 or 1:2.

In the example of FIG. 3, for example, the second operation buttons B2 superimposed on a prescribed content image are displayed in the third display region 90AR-1. For example, the second operation buttons B2 are set to be biased toward the side further away from the driver's seat with respect to the display 92 of the second touch panel 90 in the vehicle width direction. For example, the second operation buttons B2 are set at or near the end of the display 92 in the negative Y direction. For example, the second operation buttons B2 are set in an outermost region (in the negative Y direction) when the region is divided into three or four regions (divided into a prescribed number of regions) with respect to the display 92 in the Y direction. For example, a prescribed content image is displayed in the fourth display region 90AR-2. In the third display region 90AR-1, for example, no prescribed content image is displayed and the second operation button B2 may be displayed when there is a passenger in the passenger seat.

[Details Displayed in Display Region]

In the first display region 80AR-1 of the first touch panel 80, for example, one or more first operation buttons B1 related to a "driving-related function", an "in-vehicle device", and a "vehicle-side cooperation application" are displayed. The "first operation button B1 related to a function or an application" is a button for operating a function or using a service provided by the function. The "first operation button B1 related to the device" is a button for operating the in-vehicle device or controlling the device. In the second display region 80AR-2, a predetermined image and content according to the operation of the first operation button B1 are displayed.

"The driving-related function" is, for example, a driving support function, a function of searching for a parking lot position, or a function of searching for a charging facility position. Driving support functions are, for example, adaptive cruise control (ACC), a lane-keep assist system (LKAS), a collision mitigation brake system (CMBS), and the like. When the first operation button B1 related to the driving support function is operated, the driving support function is activated or the driving support function is executed. In this case, for example, in the second display region 80AR-2, information such as a support form of the driving support function that is activated or executed is displayed.

"In-vehicle devices" are, for example, devices mounted in the vehicle such as an air-conditioning device, a car navigation system, an audio device, and a telephone. When the first operation button B1 related to the in-vehicle device is operated, a power supply of a target in-vehicle device is activated or a function of the in-vehicle device is executed. In this case, for example, information about an operation, a control state, and the like of the in-vehicle device that is activated or executed is displayed in the second display region 80AR-2.

When the first operation button B1 associated with the "vehicle-side cooperation application" is operated, the vehicle-side cooperation application 52 is activated or a function capable of being executed by the application is executed. In this case, for example, information of an application that is activated or executed and information of a service provided by the application are displayed in the second display region 80AR-2.

In the third display region 90AR-1 of the second touch panel 90, for example, one or more second operation buttons B2 related to the "in-vehicle device" and the "cooperation device" are displayed. For example, there are operation buttons that are displayed only in the first display region 80AR-1 without being displayed in the third display region 90AR-1. In the third display region 90AR-1, buttons for controlling driving-related functions are not displayed. The operation buttons of the driving support function are displayed only in the first display region 80AR-1 so that only the driver operates the operation buttons. A preset image and content according to the operation of the second operation button B2 are displayed in the fourth display region 90AR-2.

For example, in the example of FIG. 3 described above, the first operation button B1 and the second operation button B2 associated with the car navigation displayed in the first display region 80AR-1 and the third display region 90AR-1 are operated and map information is displayed in the second display region 80AR-2 or the fourth display region 90AR-2.

There may be an operation button that is not displayed in the first display region 80AR-1 or an operation button that is displayed only in the first display region 80AR-1, or an operation button that is displayed only in the third display region 90AR-1 may be set by the occupant.

Although a case in which the display 70 includes a touch panel and an image is displayed on a display of the touch panel will be described in each embodiment, a region different from a display region where the first operation button B1, the second operation button B2, and other operation buttons are displayed may not be a touch panel.

That is, a display region in which no operation button is displayed may be a simple display that does not have a mechanism for receiving an input of an operation in which the indicator is in contact with the display.

[Control State of Vehicle-Side Cooperation Application]

Figure 4:
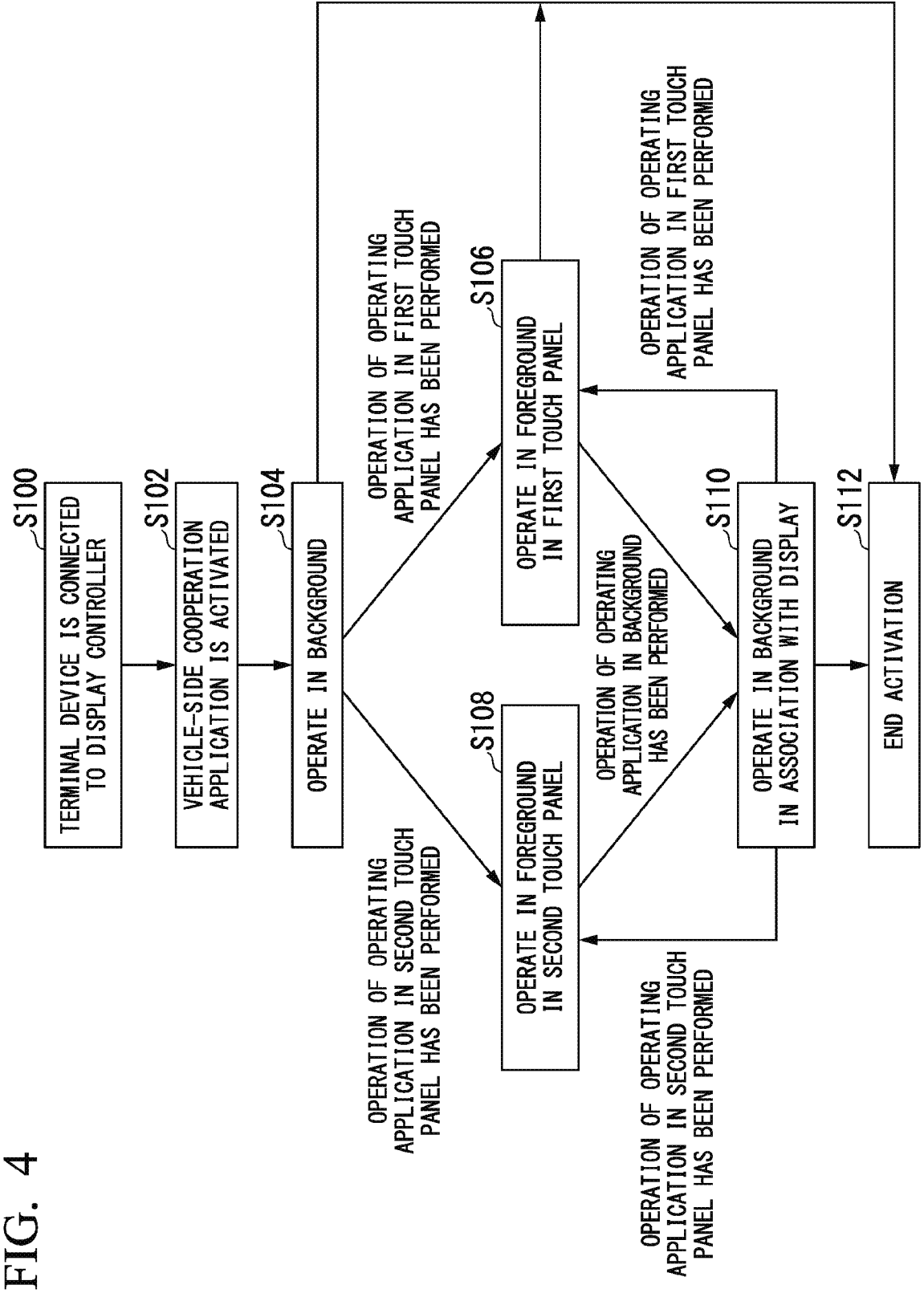
FIG. 4 is an explanatory diagram showing the transition of a control state of a vehicle-side cooperation application.

FIG. 4 is an explanatory diagram showing the transition of the control state of the vehicle-side cooperation application 52. When the terminal device 10 is connected to the display control device 30 (step S100), the vehicle-side cooperation application 52 is activated (step S102). That is, the vehicle-side cooperation application 52 starts an operation after being communicably connected to the terminal device 10 via wireless communication or wired communication.

For example, the term "connected" indicates that prescribed information has been transmitted and received between the vehicle-side cooperation application 52 and the terminal device 10. The prescribed information is information necessary for the activation or operation of the vehicle-side cooperation application 52 or information about the execution of the vehicle-side cooperation application 52. For example, the term "connected" may indicate that a communication link between the vehicle-side cooperation application 52 and the terminal device 10 has been established, that the vehicle-side cooperation application 52 can wirelessly communicate with the terminal device 10 via the first communicator 32, or that the vehicle-side cooperation application 52 can perform wired communication with the terminal device 10 via the second communicator 34.

Next, the vehicle-side cooperation application 52 operates in the background (step S104). That is, the vehicle-side cooperation application 52 starts an operation in the background after being connected to the terminal device 10. For example, the "background operation" indicates that the process of the vehicle-side cooperation application 52 is performed in a state in which information about the operation or process of the vehicle-side cooperation application 52 is not displayed on the display. When an operation of terminating the activation has been performed in step S104, the vehicle-side cooperation application 52 terminates the activation of its own application (sets the control state to a deactivated state).

When an operation of operating the vehicle-side cooperation application 52 in the foreground has been performed in an operating state in the background, the vehicle-side cooperation application 52 operates in the foreground. For example, "operating in the foreground" indicates that a process of the vehicle-side cooperation application 52 is performed in a state in which information about the operation or process of the vehicle-side cooperation application 52 has been displayed on the display.

For example, when an operation of operating the vehicle-side cooperation application 52 in the foreground in the first touch panel 80 has been performed, the vehicle-side cooperation application 52 operates in the foreground in the first touch panel 80 (step S106). For example, when an operation of operating the vehicle-side cooperation application 52 in the foreground in the second touch panel 90 has been performed, the vehicle-side cooperation application 52 operates in the foreground in the second touch panel 90 (step S108).

When an operation of operating the vehicle-side cooperation application 52 in the background has been performed in a state in which the vehicle-side cooperation application 52 is operating in the foreground, the vehicle-side cooperation application 52 operates in the background after causing the storage 50 to store information of the display that has been operated in the foreground in association with the background operation (step S110). In this state, when an operation of operating the vehicle-side cooperation application 52 in the foreground has been performed, the vehicle-side cooperation application 52 operates in the foreground in the display associated with the background operation (described in the second embodiment). When an operation of terminating the activation has been performed, the vehicle-side cooperation application 52 terminates the activation (step S112).

As described above, the vehicle-side cooperation application 52 has the following operating states (1) to (3).

(1) An operating state in the foreground (for example, steps S106 and S108)

(2) An operating state in the background in a state in which no association with the display has been made (for example, step S104)

(3) An operating state in the background in a state in which association with the display has been made (for example, step S110)

[Interrupt Process]

FIG. 5 is a flowchart showing a flow of an interrupt process to be executed by the terminal-side cooperation application 12 and the vehicle-side cooperation application 52. The interrupt process is a process in which the vehicle-side cooperation application 52 causes the display to display interrupt content (an example of a "screen associated with associated information") with priority over prescribed content when the prescribed content is displayed on the display. The interrupt content is a screen related to a function (an application) executed by the terminal device 10 to which the first controller 38 is connected (a screen related to functions to be executed by application programs related to at least some icons).

First, the terminal-side cooperation application 12 determines whether or not a prescribed operation has been performed or whether or not a prescribed function has been turned on (step S200). The prescribed operation is a preset operation and is an operation related to a function that operates in cooperation with the vehicle-side cooperation application 52. The prescribed function is a preset function and is a function that operates in cooperation with the vehicle-side cooperation application 52. The function that operates in cooperation is a function installed in the terminal device 10 such as a music player function, a sound recognition function, a route search function, a telephone function, or a mail function or a function to be executed by an application installed in the terminal device 10.

When the prescribed operation has been performed or the prescribed function has been turned on, the terminal-side cooperation application 12 transmits interrupt information to the vehicle-side cooperation application 52 (step S202). The interrupt information (an example of the "associated information") is information indicating that the prescribed operation has been performed or information indicating that the prescribed function has been turned on.

The vehicle-side cooperation application 52 determines whether or not the interrupt information has been received (step S300). When the interrupt information has been received, the vehicle-side cooperation application 52 determines whether or not its own application is operating in the foreground (step S302).

When its own application is operating in the foreground, the vehicle-side cooperation application 52 causes the display operating in the foreground to display information based on the received interrupt information (step S304). For example, the vehicle-side cooperation application 52 determines interrupt content associated with the interrupt information with reference to the associated information 54 and causes the display to display the determined content (see a state C3 of FIG. 8). FIG. 6 is a diagram showing an example of details of the associated information 54. The associated information 54 is, for example, information associated with the interrupt content displayed on the display when the interrupt information has been acquired with respect to the interrupt information.

When its own application is not operating in the foreground, the vehicle-side cooperation application 52 causes the first touch panel 80 to display information (the interrupt content) based on the received interrupt information (step S306). If the interrupt information is input when a process related to displaying of the menu screen is being executed in the background operation, the vehicle-side cooperation application 52 causes the first touch panel 80 among the plurality of displays to display content associated with the interrupt information. Thereby, the process of one routine of the present flowchart is completed.

[Specific Example of Interrupt Process (Part 1)]

Figure 7:
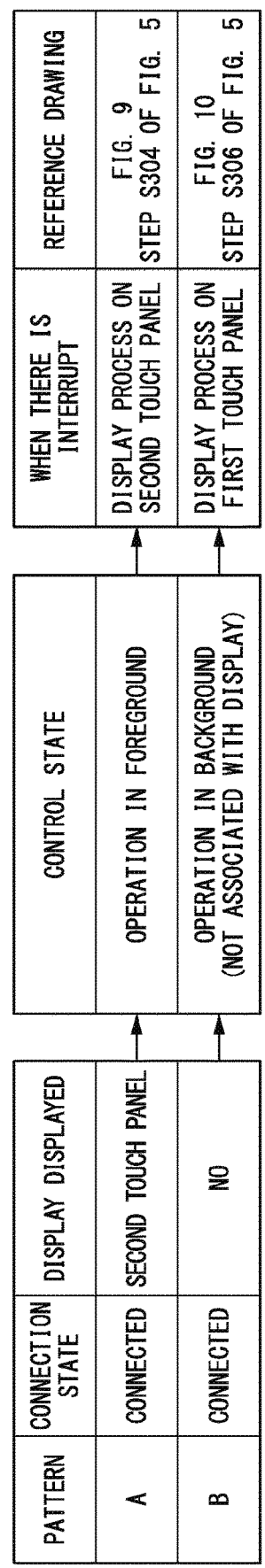
FIG. 7 is an explanatory diagram showing details of the interrupt process.
Figure 8:
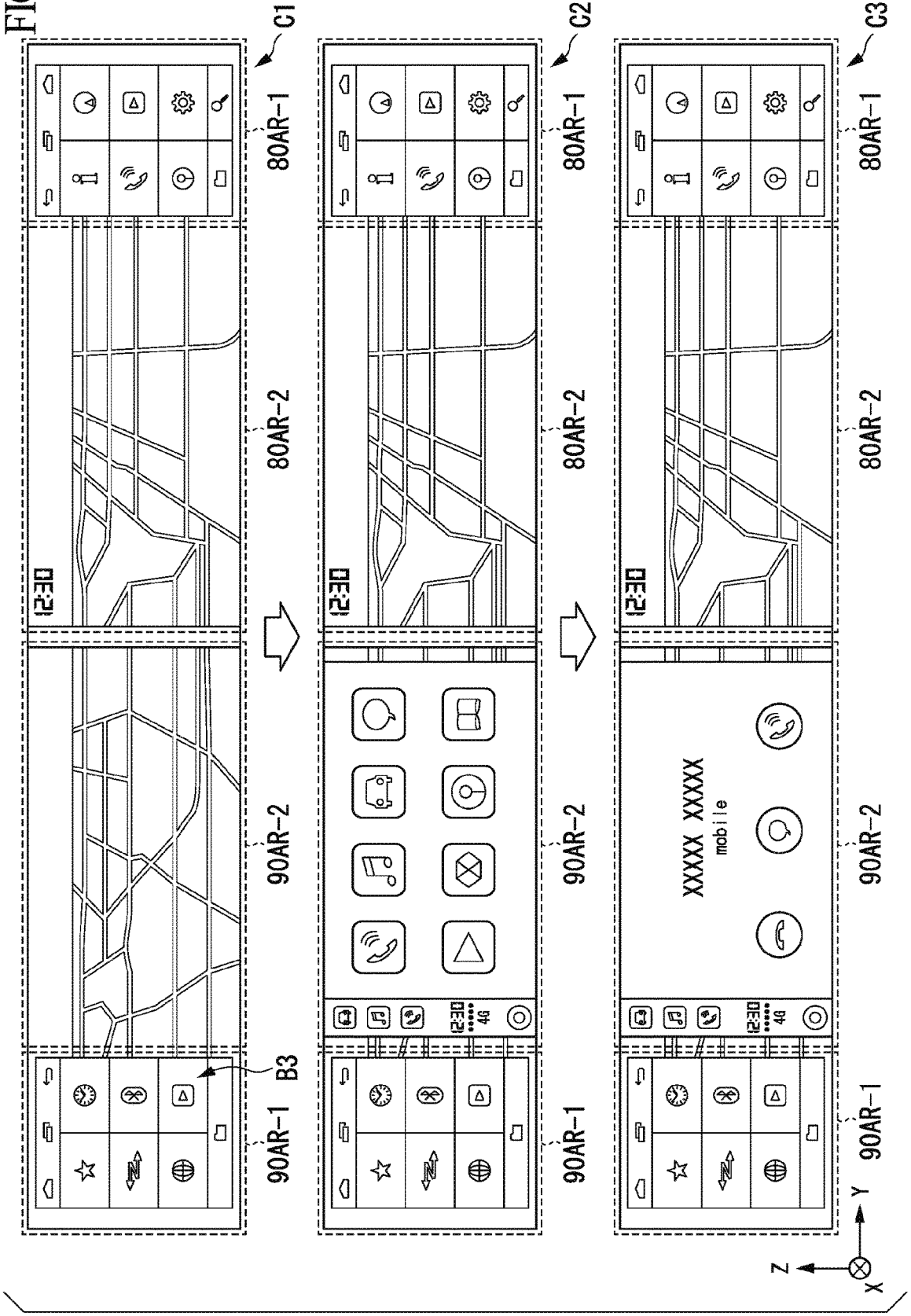
FIG. 8 is an explanatory diagram showing a pattern A of FIG. 7.

The interrupt process will be described with reference to FIGS. 7 to 9. FIG. 7 is an explanatory diagram showing the details of the interrupt process. First, a pattern A of FIG. 7 will be described with reference to FIG. 8. A state C1 of FIG. 8 is a state in which the display control device 30 has been connected to the terminal device 10. In this state, when the occupant performs an operation (a touch operation) on the application operation button B3 displayed in the third display region 90AR-1, application menu content (an example of a "menu screen") is displayed in the fourth display region 90AR-2 of the second touch panel 90 on which the application operation button B3 is displayed as shown in a state C2 of FIG. 8. That is, the vehicle-side cooperation application 52 operates in the foreground in the second touch panel 90.

The "application menu content" is the menu screen on which icons of one or more application menu programs capable of being executed by the terminal device 10 are displayed. This icon is an icon related to a function that operates in cooperation with the terminal device 10 described above.

When interrupt information has been received in an operating state in the foreground in the second touch panel 90, the vehicle-side cooperation application 52 causes the interrupt content associated with the interrupt information as shown in the state C3 of FIG. 8 to be displayed in the fourth display region 90AR-2 of the second touch panel 90 instead of the displayed content.

As described above, if the interrupt information is received when the vehicle-side cooperation application 52 is operating in the foreground, the vehicle-side cooperation application 52 causes the display associated with the foreground operation to display the interrupt content. As a result, the convenience to the user is improved because the interrupt content can be displayed in accordance with the user's intention.

When information indicating that an operation on the icon of the application menu content has been performed has been acquired, the vehicle-side cooperation application 52 causes the terminal device 10 to execute a function based on the operation on the icon. For example, when the occupant operates the icon in the state C2, the vehicle-side cooperation application 52 causes the terminal-side cooperation application 12 (or a prescribed application program of the terminal device 10) to execute a function according to the operation. For example, when an icon indicating that telephone communication is to be performed has been operated (for example, when a communication operation has been performed) in the state C3 of FIG. 8, the vehicle-side cooperation application 52 causes the terminal device 10 to execute a function related to the communication. Thereby, the occupant can use a communication function of the terminal device 10.

As described above, the vehicle-side cooperation application 52 may cause the display on which other content is displayed to display the interrupt content in a case in which the other content is being displayed on the display as well as a case in which the interrupt information is acquired when the application menu content is being displayed on the display. For example, the vehicle-side cooperation application 52 may cause the first touch panel 80 or the second touch panel 90 among the plurality of displays to display a "specific screen" on which information about functions of one or more application programs is displayed, cause the second touch panel to display a screen associated with the interrupt information when the interrupt information associated with a "displayed function or another function different from the function" is input in a state in which the specific screen is being displayed by the second touch panel 90, and cause a predetermined display among the plurality of displays to display a screen associated with the interrupt information when the interrupt information is input in a state in which the specific screen is not being displayed by any one of the plurality of displays.

The "specific screen" is a screen related to the function to be executed by an application program related to the above-described application menu content or an icon of the application menu content. The screen related to the function to be executed by the application program related to the icon of the application menu content is, for example, a screen that transitions when the above-described icon has been operated. This screen includes, for example, information about the function to be executed by the application program related to the icon. For example, when the application program is an application program related to a music player, a screen including information of music capable of being reproduced by the music player (an example of the "specific screen on which the information about the function of the application program is displayed") is displayed on the display if an icon related to the music player is operated.

For example, the "displayed function" is a function related to the icon of the application menu content. That is, the "displayed function" is a function to be executed by the terminal device 10 or a function to be executed by the vehicle-side cooperation application 52 when the icon of the application menu content has been operated. The "other function different from the function" is another function different from the function which is being executed by the application program related to the icon when the icon is operated. For example, when the icon related to the music player is operated and the function of the music player is being executed, another function different from the function of the music player is the above-described "other function different from the function". For example, when interrupt information about the telephone function is input in a state in which a screen related to the music player is being displayed on the display, a screen associated with the telephone function is displayed on the display.

The vehicle-side cooperation application 52 may cause operations of application programs related to at least some icons to be started as background operations after the display control device 30 is communicably connected to the terminal device 10. That is, after the vehicle-side cooperation application 52 is connected to the terminal device 10, each function of the terminal-side cooperation application 12 of the terminal device 10 or the terminal device 10 (for example, a music player function, a sound recognition function, a route search function, a telephone function, a mail function, or the like) may be operated in the background. In this case, the vehicle-side cooperation application 52 may cause each function of the terminal-side cooperation application 12 of the terminal device 10 or the terminal device 10 to be activated after being connected to the terminal device 10.

A pattern B of FIG. 7 will be described with reference to FIG. 9. A state C4 of FIG. 9 is a state in which the display control device 30 has been connected to the terminal device 10. In this state, because the occupant has not operated the application operation button B3 displayed in the third display region 90AR-1, the vehicle-side cooperation application 52 is operating in the background. In this case, the background operation is not associated with the first touch panel 80 and the second touch panel 90.

Figure 9:
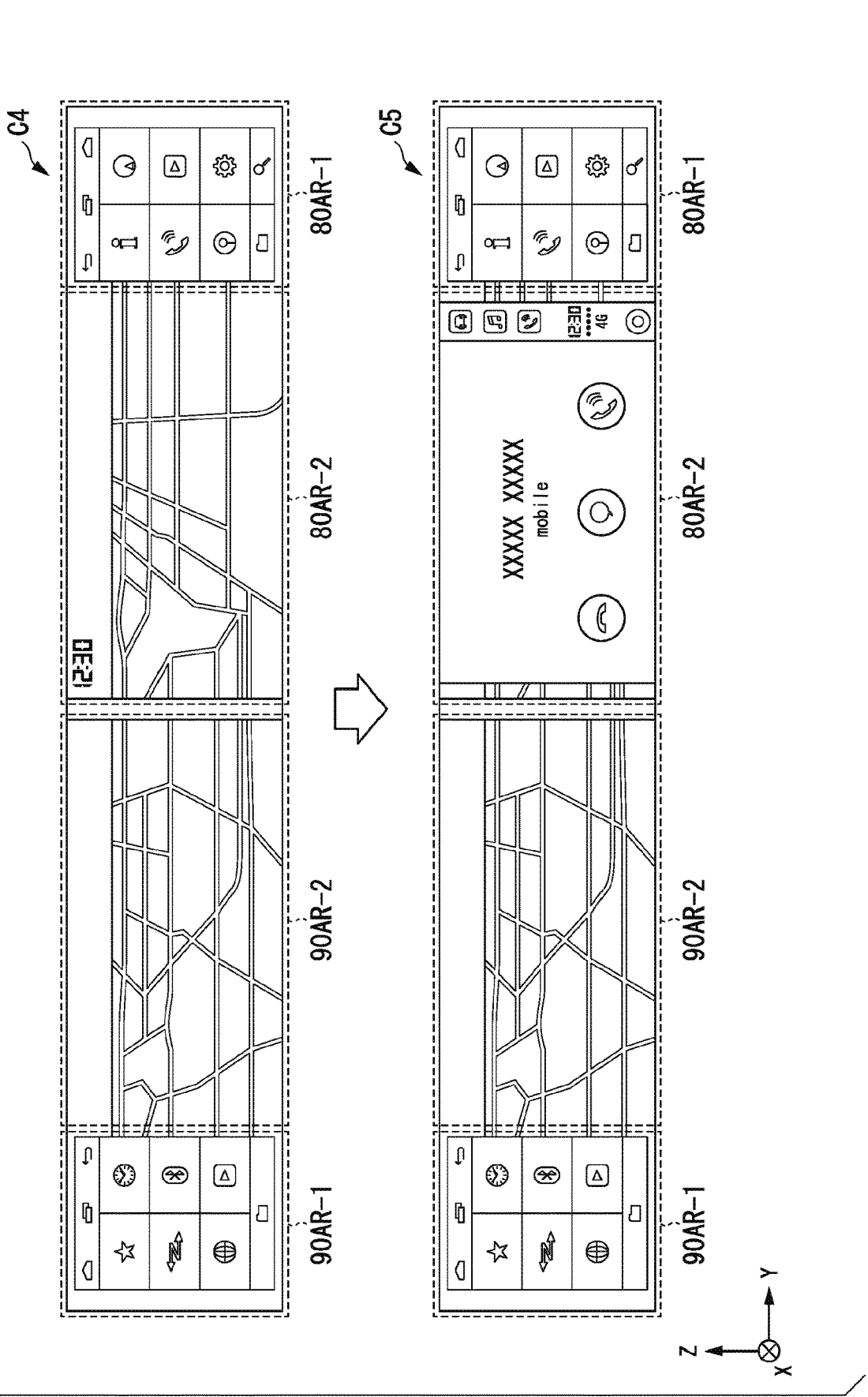
FIG. 9 is an explanatory diagram showing a pattern B of FIG. 7.

When the vehicle-side cooperation application 52 has received interrupt information in a state in which the vehicle-side cooperation application 52 operates in the background and the background operation is not associated with any display, the interrupt content associated with the interrupt information is displayed in the second display region 80AR-2 of the first touch panel 80 as shown in a state C5 in FIG. 9. When the occupant inputs a prescribed operation or a prescribed sound to the HMI 120, it is possible to have a conversation with the other party making a telephone call.

As described above, when the vehicle-side cooperation application 52 operates in the background and the operation is not associated with the display, the vehicle-side cooperation application 52 causes the display of the driver's seat side to display interrupt content if interrupt information has been received. In this case, because a case in which no occupant is present in the passenger seat or in which the occupant in the passenger seat is not using the vehicle-side cooperation application 52 is conceivable, the interrupt content is displayed on the display of the driver's seat side. As a result, the convenience to the user is improved.

[Specific Example of Interrupt Process (Part 2)]

Figure 10:
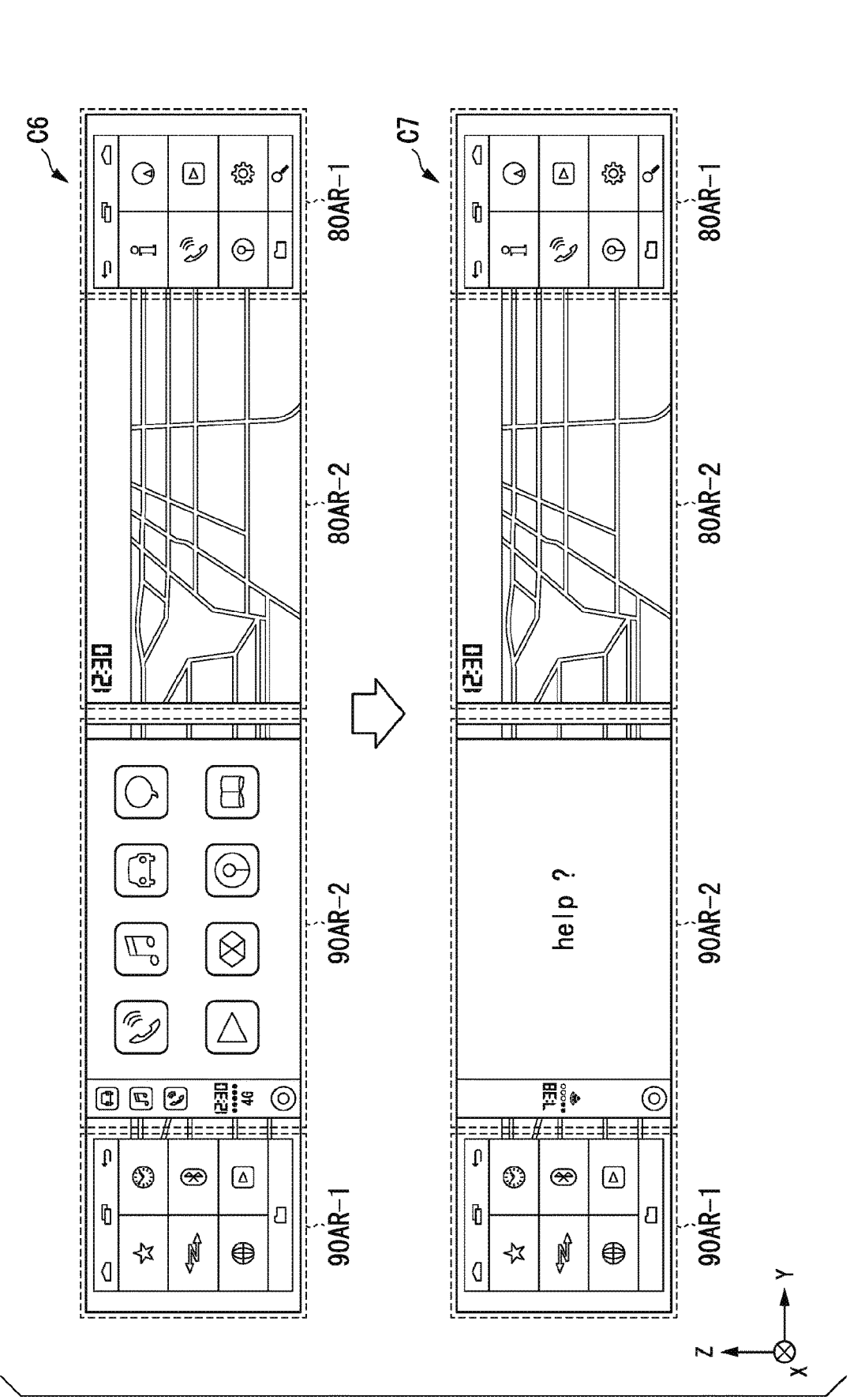
FIG. 10 is an explanatory diagram showing an interrupt process.

FIG. 10 is an explanatory diagram showing an interrupt process. As shown in a state C6 of FIG. 10, when the vehicle-side cooperation application 52 receives interrupt information in a state in which the vehicle-side cooperation application 52 is operating in the foreground in the second touch panel 90, interrupt content associated with the interrupt information is displayed on the fourth display region 90AR-2 of the second touch panel as shown in a state C7 of FIG. 10. This interrupt content is content when the interrupt information is sound recognition information.

When the occupant inputs a sound to the HMI 120 in a state in which the interrupt content has been displayed, the vehicle-side cooperation application 52 acquires sound data of the input sound and transmits the acquired sound data to the terminal device 10. The terminal device 10 requests a prescribed server device to analyze the sound data and acquires an analysis result from the server device. The terminal device 10 transmits the acquired analysis result to the vehicle-side cooperation application 52. The vehicle-side cooperation application 52 acquires the analysis result, interprets the acquired analysis result (interprets the occupant's request), and operates a prescribed device or executes a prescribed function on the basis of an interpretation result. For example, when the occupant inputs a sound of the word "hot", the vehicle-side cooperation application 52 instructs the air-conditioning device to perform air-conditioning control for decreasing the temperature and humidity. Thereby, control according to the occupant's request is implemented.

The above-described sound recognition function of the terminal device 10 may be activated by operating a cooperation function switch of the HMI 120. For example, when the cooperation function switch has been operated, the vehicle-side cooperation application 52 outputs an activation signal for causing the terminal device 10 to activate the sound recognition function. When the above-described activation signal is acquired, the terminal device 10 causes the sound recognition function to be activated. Thereby, when the occupant inputs a sound to the HMI 120, the vehicle-side cooperation application 52 acquires sound data of the input sound and transmits the acquired sound data to the terminal device 10, and the process as described above is performed. In response to the occupant's request, a prescribed device operates or a prescribed function is executed.

According to the first embodiment described above, the vehicle-side cooperation application 52 can cause the display to display interrupt content according to the user's intention. As a result, the convenience during use is improved.

Second Embodiment

Hereinafter, a second embodiment will be described. In the second embodiment, when a vehicle-side cooperation application 52 is operating in the background, the vehicle-side cooperation application 52 causes a display associated with the background operation to display interrupt content. Hereinafter, differences from the first embodiment will be mainly described.

Figure 11:
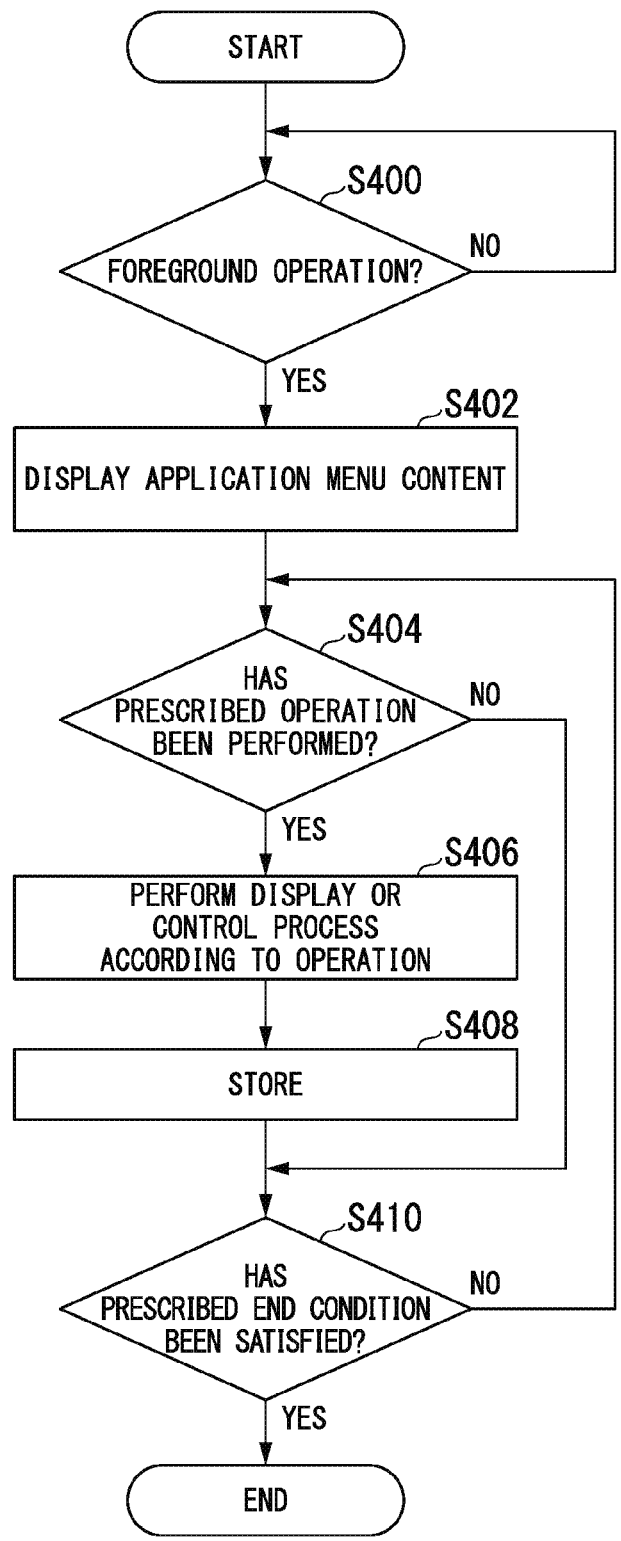
FIG. 11 is a flowchart showing an example of a flow of a process to be executed by the vehicle-side cooperation application of a second embodiment.

FIG. 11 is a flowchart showing an example of a flow of a process to be executed by the vehicle-side cooperation application 52 of the second embodiment. The present process is a process to be executed after the vehicle-side cooperation application 52 is activated.

First, the vehicle-side cooperation application 52 determines whether or not an operation of issuing a foreground operation instruction has been performed (step S400). When it is determined that the operation of issuing the foreground operation instruction has been performed, the vehicle-side cooperation application 52 causes a display subjected to the above-described operation to display application menu content (step S402).

In a state in which the application menu content has been displayed on the display subjected to the above-described operation, the vehicle-side cooperation application 52 determines whether or not a prescribed operation has been performed (step S404). The prescribed operation is an operation on an operation button displayed on the display. When the prescribed operation has not been performed, the process proceeds to the processing of step S410.

When the prescribed operation has been performed, the vehicle-side cooperation application 52 performs a display or control process according to the operation (step S406) and causes a storage 50 to store details of the process that has been performed and a processing result as state information 56 to be described below (step S408). For example, the vehicle-side cooperation application 52 performs control for executing a function associated with the operated operation button (a function of a terminal device 10) or causes the display to display information about the executed function. The processing result and the like are stored in the storage 50 as the state information 56.

Figure 12:
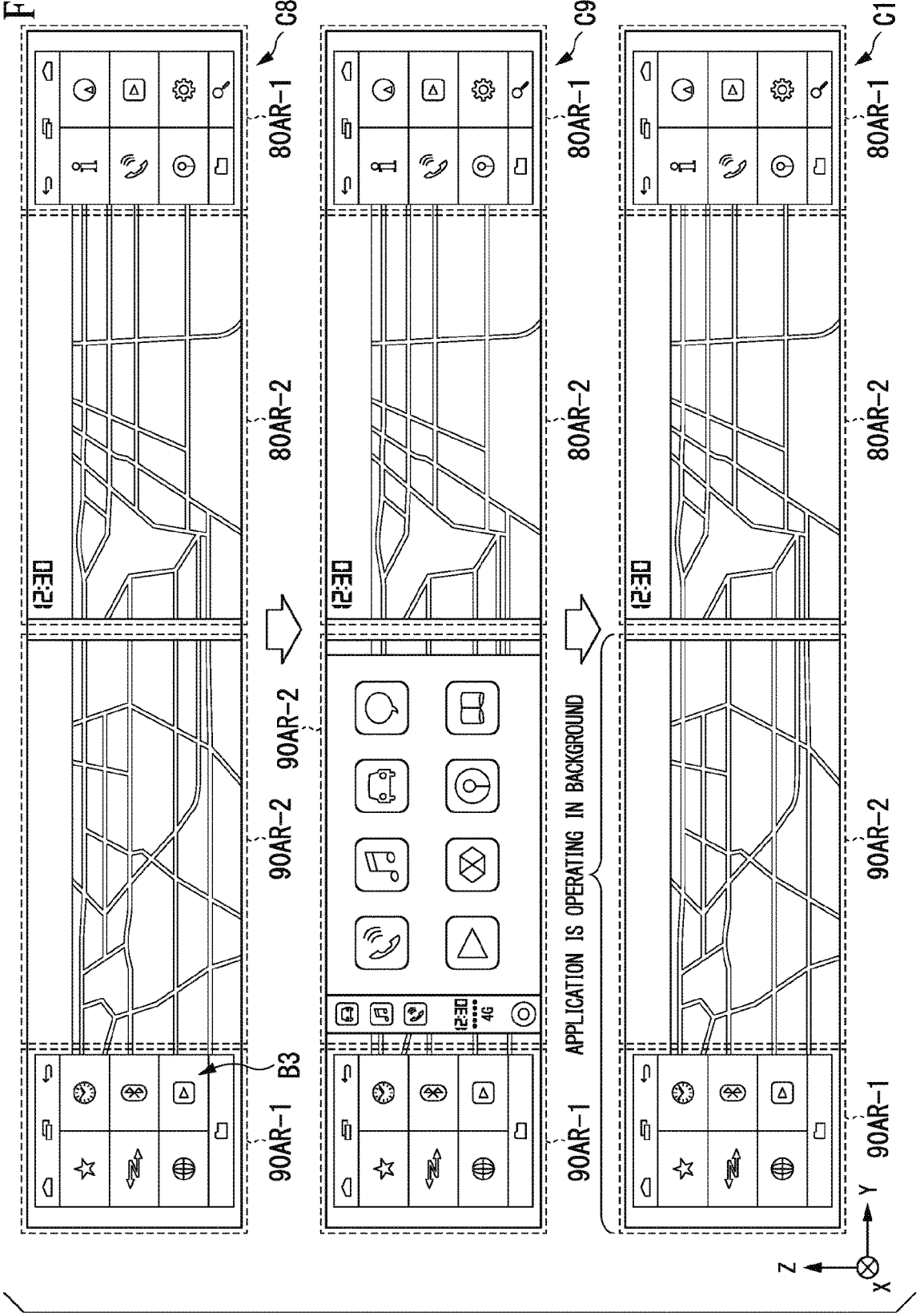
FIG. 12 is a diagram showing an example of a scene in which the vehicle-side cooperation application changes a display process of a display in accordance with an operation.

FIG. 12 is a diagram showing an example of a scene in which the vehicle-side cooperation application 52 changes display on the display in accordance with an operation. When the occupant operates an application operation button B3 in a state C8 of FIG. 12 connected to the terminal device 10 in a display control device 30, application menu content is displayed as shown in a state C9 of FIG. 12. In this state, as shown in a state C10 of FIG. 12, when the occupant performs an operation of operating the vehicle-side cooperation application 52 in the background, the vehicle-side cooperation application 52 operates in the background. In the above-described process, the vehicle-side cooperation application 52 causes the storage 50 to store details of the operation, details of the process, and the like as the state information 56. For example, when the application menu content has been displayed on a second touch panel 90, the vehicle-side cooperation application 52 causes the storage 50 to store the background operation in association with the second touch panel 90 subjected to the background operation when the operation of operating the vehicle-side cooperation application 52 in the background has been performed.

FIG. 13 is a diagram showing an example of details of the state information 56. For example, the state information 56 is information in which an application state (activation or deactivation), an operating state (an operation in the background, an operation in the foreground, or the like), a display associated with the background operation, content displayed on the display, the display displaying the content, details of the operation, the presence/absence of reception of interrupt information, a type of interrupt information, and the like are associated with an identification number of a process.

Returning to the description of FIG. 11, in step S410, the vehicle-side cooperation application 52 determines whether or not a prescribed end condition has been satisfied (step S410). When the prescribed end condition has been satisfied, the process of one routine of the present flowchart is completed. When the prescribed end condition has not been satisfied, the process returns to the processing of step S404. The prescribed end condition is, for example, that an operation of deactivating the vehicle-side cooperation application 52 has been performed, that the connection between the vehicle-side cooperation application 52 and the terminal device 10 has been disconnected, or the like.

[Interrupt Process]

Figure 14:
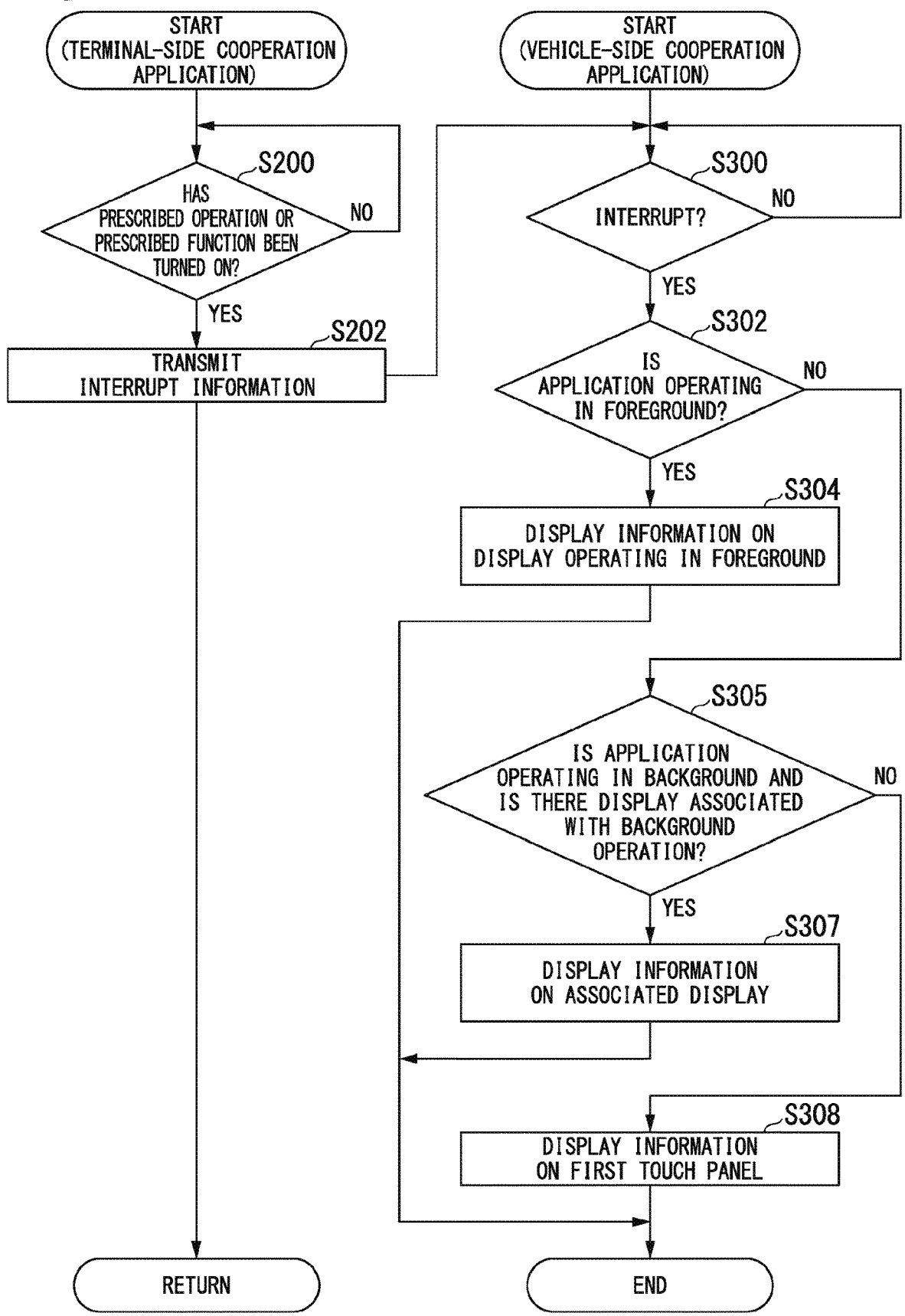
FIG. 14 is a flowchart showing a flow of an interrupt process to be executed by the terminal-side cooperation application and the vehicle-side cooperation application.

FIG. 14 is a flowchart showing a flow of an interrupt process to be executed by the terminal-side cooperation application 12 and the vehicle-side cooperation application 52. Because the processing of steps S200, S202, and S300 to S304 of FIG. 14 is similar to the processing of the same step numbers of FIG. 5, description thereof will be omitted.

When it is determined that the vehicle-side cooperation application 52 is not operating in the foreground in step S302, the vehicle-side cooperation application 52 determines whether or not its own application is operating in the background and there is a display associated with the background operation with reference to the state information 56 (step S305). When its own application is operating in the background and there is a display associated with the background operation, the vehicle-side cooperation application 52 causes the display associated with the background operation in the state information 56 to display information based on received interrupt information (step S307). That is, if the interrupt information is input when a process related to displaying of application menu content in the background operation is being executed, the vehicle-side cooperation application 52 causes the display associated with the background operation to display interrupt content associated with the interrupt information. In the processing of step S307, information based on the interrupt information may be displayed on a first touch panel 80 (a modified example of step S307).

Figure 15:
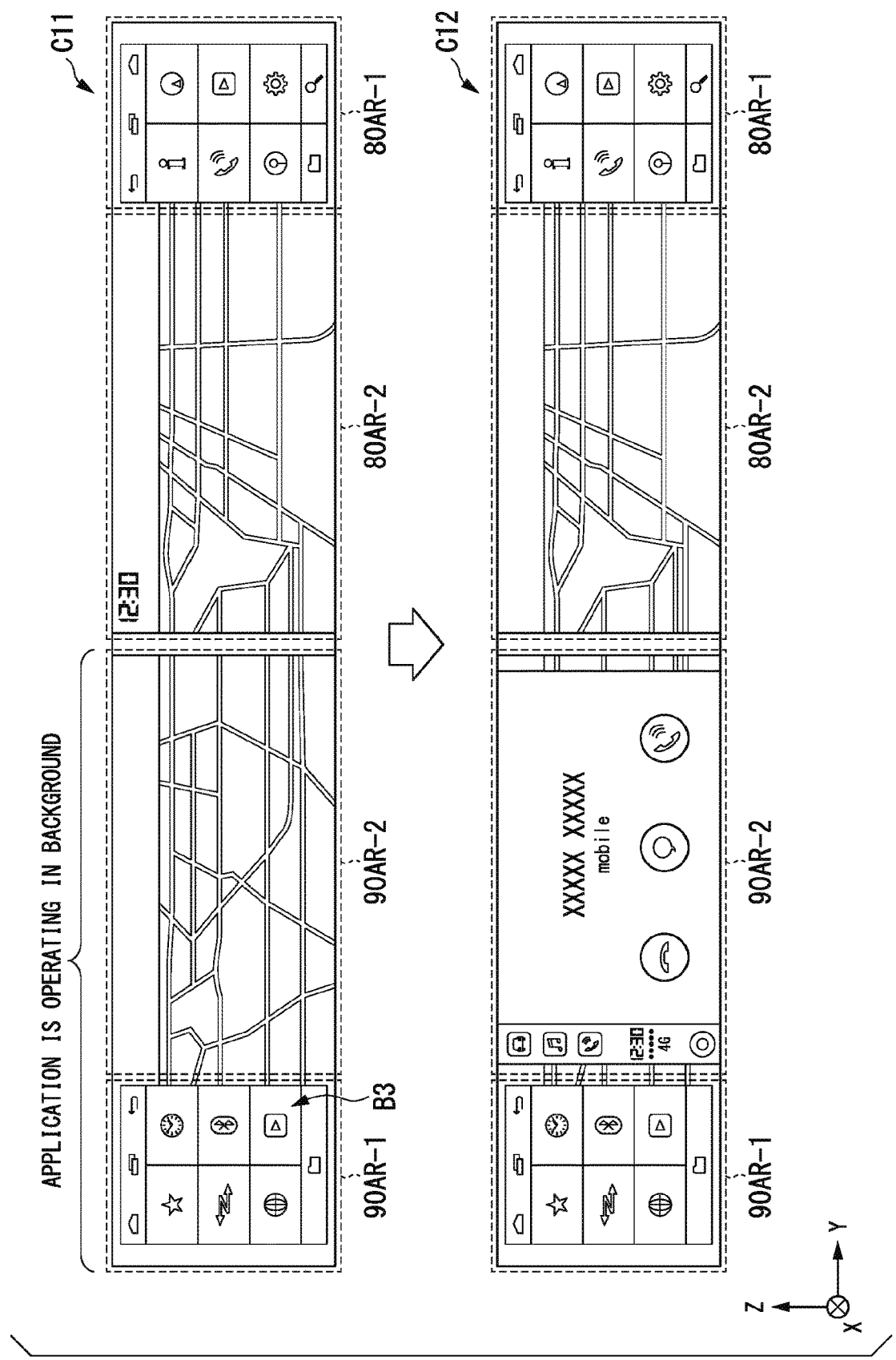
FIG. 15 is an explanatory diagram showing the interrupt process.

FIG. 15 is an explanatory diagram showing an interrupt process. When the vehicle-side cooperation application 52 receives interrupt information in a state in which the vehicle-side cooperation application 52 is operating in the background in the second touch panel 90 as shown in a state C11 of FIG. 15, interrupt content associated with the interrupt information is displayed on a fourth display region 90AR-2 of the second touch panel 90 as shown in a state C12 of FIG. 15.

Returning to the description of FIG. 14, when, although its own application is operating in the background, there is no display associated with the background operation or the state is a "non-operating state in the background" to be described below, the vehicle-side cooperation application 52 causes the first touch panel 80 to display information based on the received interrupt information (step S308). Thereby, the process of one routine of the present flowchart is completed.

For example, as the operating state of the vehicle-side cooperation application 52, there is a "non-operating state in the background (hereinafter, a pre-activation state)" in step S308 in addition to the above (1) to (3). The pre-activation state is an activation state in which, although the display control device 30 has been connected to the terminal device 10, the display control device 30 is operating at a degree of information processing that is lower than a degree of information processing in the background operation. When the vehicle-side cooperation application 52 has acquired prescribed information or has acquired information indicating that a prescribed operation has been performed in the pre-activation state, the transition from the pre-activation state to the operating state of the background or the operating state of the foreground is performed. In the case of the pre-activation state, the vehicle-side cooperation application 52 causes the first touch panel 80 to display information based on the received interrupt information as in step S308 (a pattern D of FIG. 16 to be described below).

Figure 16:
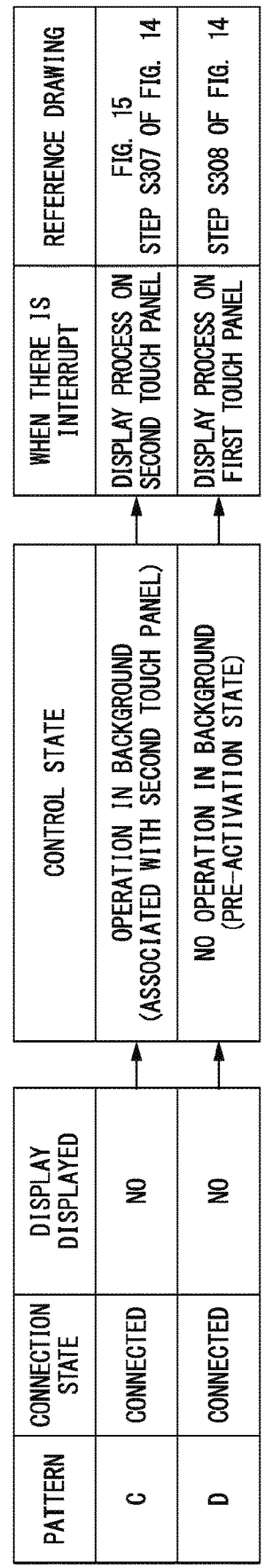
FIG. 16 is a diagram showing an overview of the interrupt process of FIG. 14.

FIG. 16 is a diagram showing an overview of the interrupt process of FIG. 14. As shown in a pattern C in FIG. 16, if an operation is associated with the second touch panel 90 when the vehicle-side cooperation application 52 is operating in the background, the vehicle-side cooperation application 52 causes the associated second touch panel 90 to display interrupt content.

As described above, when the vehicle-side cooperation application 52 is operating in the background and there is a display associated with the background operation, the vehicle-side cooperation application 52 causes the display associated with the background operation to display the interrupt content. As a result, because the interrupt content can be displayed in accordance with a user's intention, the convenience to the user is improved.

As shown in a pattern D of FIG. 16, if the interrupt information has been received when the vehicle-side cooperation application 52 is in the pre-activation state, the vehicle-side cooperation application 52 causes the first touch panel 80 to display the interrupt content.

As described above, when the vehicle-side cooperation application 52 is not operating in the background or there is no display associated with the background operation, the vehicle-side cooperation application 52 causes the display of the driver's seat side to display the interrupt content if the interrupt information has been received. In this case, because a case in which no occupant is present in the passenger seat or in which the occupant of the passenger seat is not using the vehicle-side cooperation application 52 is conceivable, the interrupt content is displayed on the display of the driver's seat side. As a result, the convenience to the user is improved.

According to the second embodiment described above, the vehicle-side cooperation application 52 can cause the display to display interrupt content according to the user's intention. As a result, the convenience during use is improved.

Third Embodiment

Hereinafter, a third embodiment will be described. In the third embodiment, a vehicle-side cooperation application 52 determines a display on which interrupt content is displayed on the basis of a history of the display on which the interrupt content has been previously displayed. Hereinafter, differences from the first embodiment will be mainly described.

Figures 17, 18:
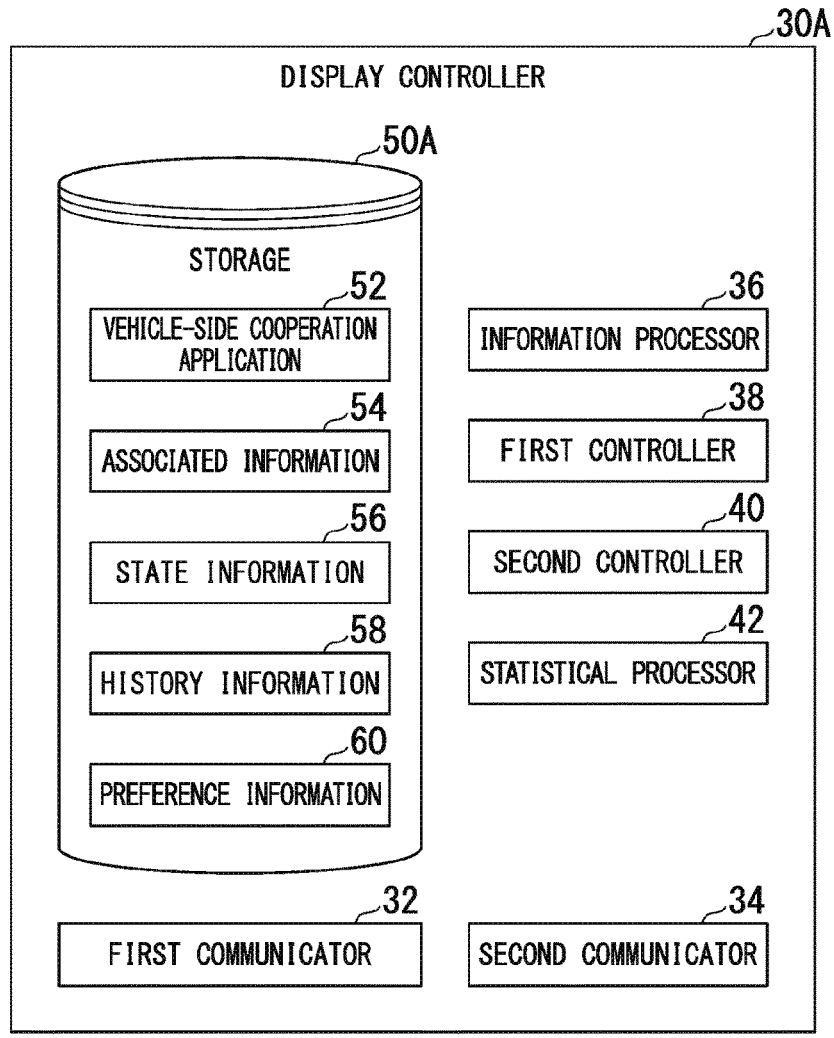
FIG. 17 is a diagram showing an example of a functional configuration of a display control device of a third embodiment.
FIG. 18 is a diagram showing an example of details of history information.

FIG. 17 is a diagram showing an example of a functional configuration of a display control device 30A of the third embodiment. For example, the display control device 30A further includes a statistical processor 42 in addition to the functional configuration of the display control device 30 of the first embodiment. The display control device 30A includes a storage 50A instead of the storage 50. The storage 50A further includes history information 58 and preference information 60 in addition to the information stored in the storage 50. The history information 58 is, for example, information obtained by the statistical processor 42 statistically processing various information to be described below.

FIG. 18 is a diagram showing an example of details of the history information 58. For example, the history information 58 is information in which a period of continuous time for which interrupt content or prescribed content related to the vehicle-side cooperation application 52 has been displayed, a type of display on which the above-described content has been displayed, the number of times a terminal device 10 has been connected to the display control device 30A, the number of times a power supply (or the ignition) of the vehicle has been controlled so that the power supply (or the ignition) of the vehicle is in an on state or an off state, an operation history related to the vehicle-side cooperation application 52, and the like are associated with an identification number (for example, an IP address) of the connected terminal device 10.

The statistical processor 42 generates the history information 58 as described above. The statistical processor 42 generates the preference information 60 with reference to the history information 58. For example, in the history information 58, the statistical processor 42 assigns a score associated with the first touch panel 80 or a score associated with the second touch panel 90 to each item and generates the preference information 60 on the basis of the score. For example, when the prescribed terminal device 10 has been connected to the display control device 30A, the statistical processor 42 generates the preference information 60 so that the interrupt content is displayed on the first touch panel 80 if a degree to which content related to the vehicle-side cooperation application 52 should be displayed on the first touch panel 80 is high or higher than a predetermined degree. Otherwise, the statistical processor 42 generates the preference information 60 so that the content related to the vehicle-side cooperation application 52 is displayed on the second touch panel 90. The statistical processor 42 may request another server device to generate the history information 58 and the preference information 60.

FIG. 19 is a diagram showing an example of details of the preference information 60. For example, the preference information 60 is information associated with a display that displays interrupt content with respect to an identification number (a terminal ID) of the terminal device 10.

FIG. 20 is a flowchart showing an example of a flow of a process to be executed by the vehicle-side cooperation application 52 of the third embodiment. The present process is a process to be executed in the above-described activation state. First, the vehicle-side cooperation application 52 determines whether or not interrupt information has been received (step S500). It is assumed that the vehicle-side cooperation application 52 acquires the terminal ID together with the interrupt information or before the interrupt information is acquired.

When the interrupt information has been received, the vehicle-side cooperation application 52 determines whether or not the preference information 60 associated with the terminal ID has been stored in the storage 50A (step S502). When it is determined that the preference information 60 associated with the terminal ID has been stored in the storage 50A, the vehicle-side cooperation application 52 causes a display associated with the terminal ID to display interrupt content with reference to the preference information 60 (step S504). When it is determined that the preference information 60 associated with the terminal ID has not been stored in the storage 50A, the vehicle-side cooperation application 52 causes the first touch panel 80 to display interrupt content (step S506).

According to the third embodiment described above, because the vehicle-side cooperation application 52 takes into account the user's preference and the interrupt content can be displayed on the display according to the user's intention, the convenience to the user is further improved.

Other Examples (1)

The above-described process may be performed in a touch panel 80# instead of the first touch panel 80 and the second touch panel 90. FIG. 21 shows an example of the touch panel 80#. A first display region 80AR-1, a second display region 80AR-2, a third display region 90AR-1, and a fourth display region 90AR-2 are provided in the touch panel 80#. One or both of the first display region 80AR-1 and the second display region 80AR-2 are examples of "display regions B" and one or both of the third display region 90AR-1 and the fourth display region 90AR-2 are examples of "second information display regions".

A state C1# of FIG. 21 is a state in which the display control device 30A is connected to the terminal device 10. In this state, when an occupant operates an application operation button B3 displayed in the third display region 90AR-2, application menu content is displayed in the fourth display region 80AR-2 as shown in a state C2# of FIG. 21. When interrupt information has been received in an operating state in the foreground, the vehicle-side cooperation application 52 causes interrupt content associated with the interrupt information to be displayed in the fourth display region 90AR-2 as shown in a state C3# of FIG. 21. The process when the application is operating in the foreground has been described as an example and the processes of the first to third embodiments may be performed on the touch panel 80#.

Other Examples (2)

Figure 22:
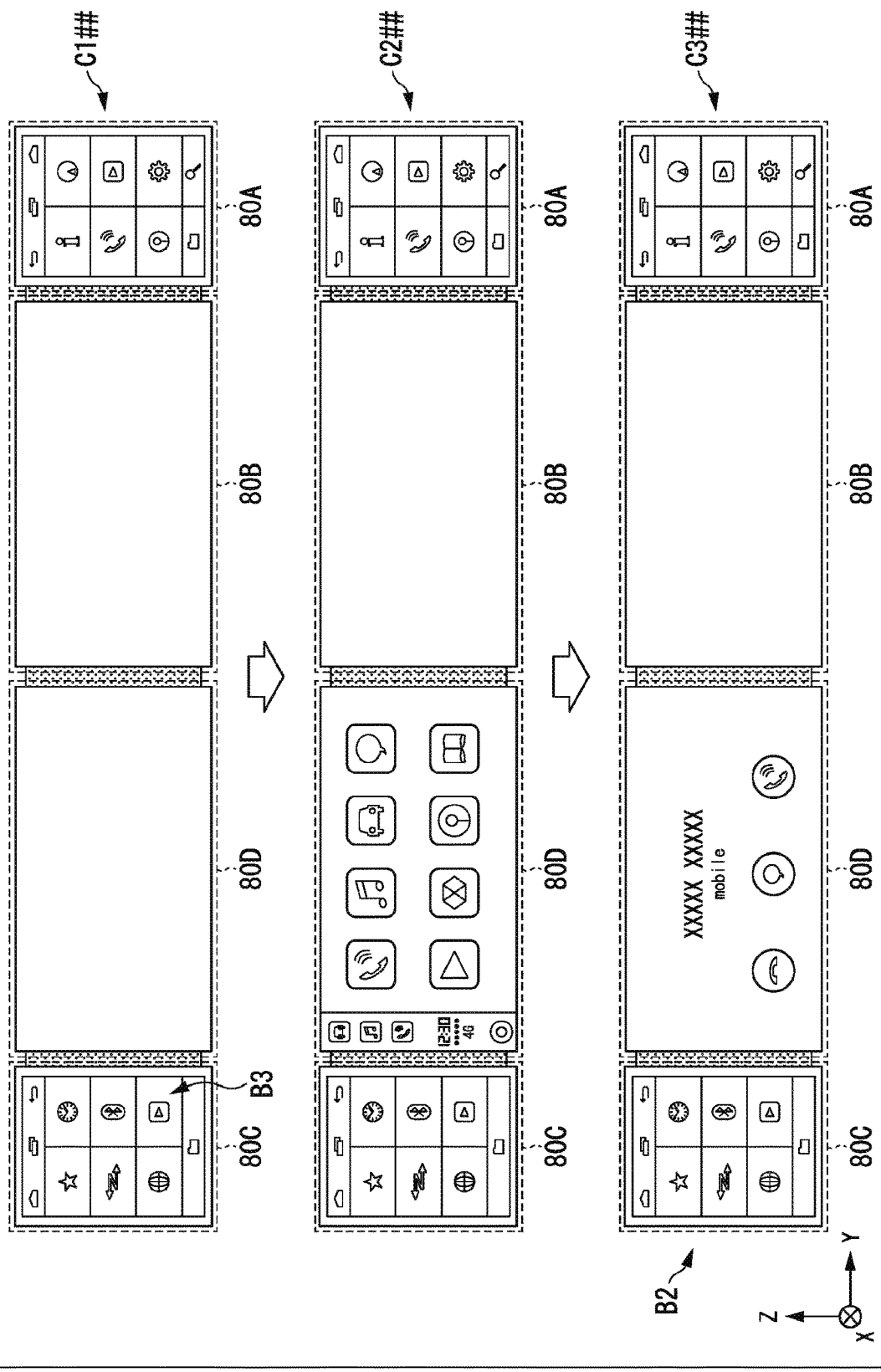
FIG. 22 is a diagram showing an example of a display including four touch panels.

The above-described process may be performed on three or more touch panels instead of the first touch panel 80 and the second touch panel 90. FIG. 22 is a diagram showing an example of a display 70 including four touch panels. The display 70 includes an $A^{th}$ touch panel 80A, a $B^{th}$ touch panel 80B, a $C^{th}$ touch panel 80C, and a $D^{th}$ touch panel 80D. Display regions of the $A^{th}$ touch panel 80A, the $B^{th}$ touch panel 80B, the $C^{th}$ touch panel 80C, and the $D^{th}$ touch panel 80D correspond to the first display region 80AR-1, the second display region 80AR-2, the third display region 90AR-1, and the fourth display region 90AR-2, respectively.

A state C1## of FIG. 22 is a state in which the display control device 30A is connected to the terminal device 10. In this state, when the occupant operates the application operation button B3 displayed on the $C^{th}$ touch panels 80C, application menu content is displayed on the $D^{th}$ touch panel 80D as shown in a state C2## in FIG. 22. When interrupt information has been received in an operating state in the foreground on the $D^{th}$ touch panel 80D, the vehicle-side cooperation application 52 causes the $D^{th}$ touch panel 80D to display interrupt content associated with the interrupt information as shown in a state C3## of FIG. 22. The process when the application is operating in the foreground has been described as an example and the processes of the first to third embodiments may be performed on the $A^{th}$ to $D^{th}$ touch panels 80A to 80D.

The processes of the above-described embodiments may be appropriately executed in combination.

[Hardware Configuration]

Figure 23:
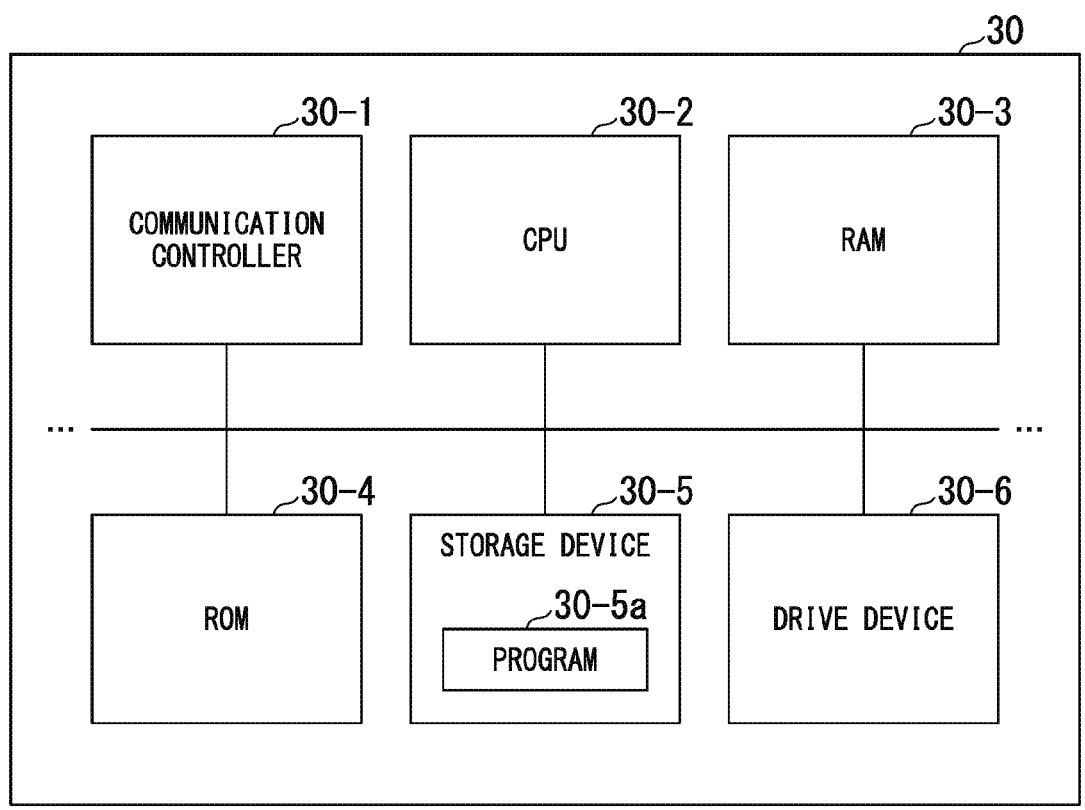
FIG. 23 is a diagram showing an example of a hardware configuration of the display control device of the embodiment.

FIG. 23 is a diagram showing an example of a hardware configuration of the display control device 30 of the embodiment. As shown in FIG. 23, the display control device 30 has a configuration in which a communication controller 30-1, a CPU 30-2, a random-access memory (RAM) 30-3 used as a working memory, a read-only memory (ROM) 30-4 storing a boot program and the like, a storage device 30-5 such as a flash memory or a hard disk drive (HDD), a drive device 30-6, and the like are mutually connected by an internal bus or a dedicated communication line. The communication controller 30-1 communicates with components other than the display control device 30. A program 30-5a executed by the CPU 30-2 is stored in the storage device 30-5. This program is loaded to the RAM 30-3 by a direct memory access (DMA) controller (not shown) or the like and executed by the CPU 30-2. Thereby, some or all of the information processor 36, the first controller 38, and the second controller 40 are implemented.

The embodiment described above can be implemented as follows.

A display device, including:
a plurality of displays;
a storage device storing a first application program; and
a hardware processor configured to execute the first application program,
wherein the hardware processor executes the first application program stored in the storage device to
cause a first or second display among the plurality of displays to display a specific screen on which information about a function of an application program is displayed,
cause the second display to display a screen associated with associated information when associated information associated with the function that has been displayed or associated information associated with another function different from the function is input in a state in which the specific screen has been displayed by the second display, and
cause a predetermined display among the plurality of displays to display the screen associated with the associated information when the associated information is input in a state in which the specific screen has not been displayed by any one of the plurality of displays.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device, comprising:
a plurality of displays; and
a processor configured to execute a first application program,
wherein the first application program causes a first display or a second display among the plurality of displays to display a specific screen on which information about a function of an application program is displayed,
wherein the first application program causes the second display to display a screen associated with associated information when associated information associated with the function of the application program on the specific screen that is currently being displayed or associated information associated with another function different from the function is input in a state in which the specific screen is currently being displayed by the second display, and
wherein the first application program causes a predetermined display among the plurality of displays to display the screen associated with the associated information when the associated information is input in a state in which the specific screen is not currently being displayed by any one of the plurality of displays,
wherein the plurality of displays have the first display and the second display,
the first application program causes the second display to display the specific screen and cause the first display to display a first content different from the specific screen, then wherein the first application program causes the first display to display the first content and causes the second display to display the screen associated with the associated information when the associated information is input from a terminal device in which the application program is installed in a state in which the specific screen being currently displayed by the second display and the first content being currently displayed by the first display, and
the first application program causes the first display to display the first content different from the specific screen and causes the second display to display a second content, the second content is different from the specific screen and the first content, then wherein the first application program causes the first display to display a content based on the associated information instead of the first content when the associated information is input from a terminal device in which the application program is installed in a state in which the first content being currently displayed by the first display and the second content being currently displayed by the second display.

2. The display device according to claim 1,
wherein the specific screen is a menu screen on which icons of a plurality of application programs are displayed or a screen related to functions to be executed by application programs related to the icons, and wherein the screen associated with the associated information is a screen related to functions to be executed by application programs related to at least some icons of the icons of the plurality of application programs.

3. The display device according to claim 2,
wherein the first application program causes the first display or the second display among the displays to display the menu screen on which the icons of the plurality of application programs are displayed, and
wherein the first application program causes a terminal device, which communicates with the display device, to execute the function based on an operation on an icon when information indicating that the operation has been performed on the icon displayed on the menu screen has been acquired.

4. The display device according to claim 1, wherein the specific screen is a menu screen on which icons of a plurality of application programs are displayed or a screen related to functions to be executed by the plurality of application programs related to the icons.

5. The display device according to claim 1,
wherein each of the plurality of displays is provided in a vehicle interior of a vehicle,
wherein the second display is provided more biased toward a passenger seat side than the first display in a vehicle width direction, and
wherein the predetermined display is the first display.

6. The display device according to claim 1,
wherein the first application program causes the first display or the second display among the displays to display a menu screen on which icons of a plurality of application programs are displayed,
wherein application programs related to at least some icons of the icons of the plurality of application programs are application programs to be executed in a terminal device that communicates with the display device via wireless communication or wired communication, and
wherein the first application program causes operations of the application programs related to the at least some icons to be started in a background operation after the display device is communicably connected to the terminal device.

7. The display device according to claim 1,
wherein the first application program causes the first display or the second display among the displays to display a menu screen on which icons of a plurality of application programs are displayed,
wherein application programs related to at least some icons are application programs to be executed in a terminal device that communicates with the display device via wireless communication or wired communication, and
wherein the first application program causes an operation to be started in the background after the display device is communicably connected to the terminal device.

8. The display device according to claim 1,
wherein the specific screen is a menu screen on which icons of a plurality of application programs are displayed or a screen related to functions to be executed by application programs related to the icons, and
wherein the first application program causes the first display among the plurality of displays to display a screen associated with the associated information if the associated information is input when a process related to displaying of the specific screen is being executed in a background operation.

9. The display device according to claim 1,
wherein the specific screen is a menu screen on which icons of a plurality of application programs are displayed or a screen related to functions to be executed by application programs related to the icons, and
wherein the first application program causes a display associated with a background operation to display a screen associated with the associated information if the associated information is input when a process related to displaying of the specific screen is being executed by the background operation.

10. The display device according to claim 1, further comprising a storage configured to store associated information in which the associated information is associated with information about the screen associated with the associated information,
wherein the first application program causes the first display or the second display to display the screen associated with the associated information associated with the input associated information with reference to the associated information.

11. The display device according to claim 1
wherein the application program is executed in a terminal device that communicates with the display device via wireless communication or wired communication.

12. The display device according to claim 1
wherein the associated information is provided by a terminal device that communicates with the display device through wireless communication or wired communication.

13. The display device according to claim 1
wherein the associated information is provided by the application program in a case that an operation for the application program is performed or a function of the application program is turned on, the application program is executed by a terminal device, the terminal device communicates with the first application program through wireless communication or wired communication.

14. A display device, comprising:
a display; and
a processor configured to execute a first application program,
wherein the first application program causes a specific screen on which information about a function of an application program is displayed to be displayed in a first information display region or a second information display region of the display,
wherein the first application program causes a screen associated with associated information to be displayed in the second information display region when associated information associated with the function of the application program on the specific screen that is currently being displayed or associated information associated with another function different from the function is input in a state in which the specific screen is currently being displayed in the second information display region, and
wherein the first application program causes the screen associated with the associated information to be displayed in a predetermined display region of the display when the associated information is input in a state in which the specific screen is not currently being displayed in either one of the first information display region and the second information display region of the display, the first application program causes the specific screen to be displayed in second information display region and cause a first content different from the specific screen to be displayed in the first information display region, then wherein the first application program causes the first content to be displayed in the first information display region and causes the screen associated with the associated information to be displayed in the second information display region when the associated information is input from a terminal device in which the application program is installed in a state in which the specific screen being currently displayed in the second information display region and the first content being currently displayed in the first information display region, and the first application program causes the first content different from the specific screen to be displayed in the first information display region and causes a second content to be displayed in the second information display region, the second content is different from the specific screen and the first content, then wherein the first application program causes a content based on the associated information instead of the first content to be displayed in the first information display region when the associated information is input from a terminal device in which the application program is installed in a state in which the first content being currently displayed in the first information display region and the second content being currently displayed in the second information display region.

15. A display device, comprising:

a plurality of displays; and a processor configured to execute a first application program, wherein the first application program causes a first display or a second display among the plurality of displays to display a specific screen on which information about a function of an application program is displayed, wherein the first application program causes the second display to display a screen associated with associated information when associated information associated with the function of the application program on the specific screen that is currently being displayed or associated information associated with another function different from the function is input in a state in which the specific screen is currently being displayed by the second display, and wherein the first application program causes a predetermined display among the plurality of displays to display the screen associated with the associated information when the associated information is input in a state in which the specific screen is not currently being displayed by any one of the plurality of displays, wherein when an operation for executing the first application program in a background is performed in a state in which the specific screen being currently displayed by the second display, the first application program causes the second display not to display the specific screen, cause the first application program to execute in the background, cause a storage to store information indicating that the first application program executes in the background by the second display, then when the associated information is input in a state in which the specific screen not being currently displayed by a plurality of displays, the first application program causes the second display to display the specific screen with reference to the information indicating that the first application program executes in the background by the second display.

* * * * *